(12) United States Patent
Yoshizawa et al.

(10) Patent No.: US 7,282,288 B2
(45) Date of Patent: Oct. 16, 2007

(54) FUEL CELL SYSTEM AND METHOD

(75) Inventors: Koudai Yoshizawa, Kanagawa-ken (JP); Yasukazu Iwasaki, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 842 days.

(21) Appl. No.: 10/162,563

(22) Filed: Jun. 6, 2002

(65) Prior Publication Data

US 2003/0003334 A1    Jan. 2, 2003

(30) Foreign Application Priority Data

Jun. 27, 2001    (JP)    ............... 2001-194934

(51) Int. Cl.
*H01M 8/04*    (2006.01)
(52) U.S. Cl. ............... 429/23; 429/13; 429/26
(58) Field of Classification Search .................. 429/23, 429/24, 26, 13, 12, 34
See application file for complete search history.

(56) References Cited

U.S. PATENT DOCUMENTS

| 6,087,028 | A |   | 7/2000 | Goto |        |
| 6,740,437 | B2| * | 5/2004 | Ballantine et al. | ............ 429/23 |

FOREIGN PATENT DOCUMENTS

| JP | 58-166675 | A  | 10/1983 |
| JP | 61-156638 | A  | 7/1986  |
| JP | 8-502855  | A  | 3/1996  |
| JP | 08-250130 |    | 9/1996  |
| JP | 09/330731 | A  | 12/1997 |
| JP | 10-172599 |    | 6/1998  |
| JP | 2000-090950 | A | 3/2000 |
| JP | 2000-208160 | A | 7/2000 |
| JP | 2000-233902 | A | 8/2000 |
| JP | 2001-023678 | A | 1/2001 |
| WO | WO95/06335  | A1 | 3/1995 |

* cited by examiner

*Primary Examiner*—Patrick Joseph Ryan
*Assistant Examiner*—Monique Wills
(74) *Attorney, Agent, or Firm*—Foley & Lardner LLP

(57) ABSTRACT

A fuel cell system is provided with a fuel cell body, a hydrogen supply system supplying hydrogen containing gas to the fuel cell body, an oxygen supply system supplying oxygen containing gas to the fuel cell body, a cooling system adjusting the temperature of the fuel cell body, a water circulation system supplying water to humidify the fuel cell body and collecting water discharged from the fuel cell body, a generated heat amount calculating section calculating a generated heat amount of the fuel cell body, a cooling performance calculating section calculating a cooling performance of the cooling system, a temperature calculating section calculating a fuel cell temperature of the fuel cell body on the basis of the generated heat amount and the cooling performance, a collected water amount calculating section calculating an amount of water collected from the water circulation system on the basis of the fuel cell temperature, and a collected water amount controlling section controlling the amount of collected water discharged from the fuel cell body on the basis of the amount of collected water.

15 Claims, 19 Drawing Sheets

FUEL CELL SYSTEM AND METHOD

BACKGROUND OF THE INVENTION

The present invention relates to a fuel cell system and a method, and more particularly, to a fuel cell system and a related control method satisfying a water balance and a heat balance of the fuel cell system while enabling a fuel cell to be efficiently operated.

Fuel cell systems are well known and are supplied with hydrogen and oxygen gases that react to convert chemical energy directly into electrical energy.

In a fuel cell system having a fuel cell utilizing an electrolyte layer, the fuel cell generally includes an anode electrode and a cathode electrode separated by the electrolyte layer. A reactant such as fuel gas containing hydrogen is supplied to the anode electrode, and an oxidant such as oxygen containing gas is supplied to the cathode electrode. In such a fuel cell utilizing the electrode pair, electrochemical reaction occurs at surfaces of the electrolyte as expressed by chemical formulae (1) and (2) to provide electrical energy.

Anode reaction: $H_2 \rightarrow 2H^+ + 2e^-$ (1)

Cathode reaction: $2H^+ + 2e^- + (\frac{1}{2})O_2 \rightarrow H_2O$ (2)

In such fuel cell systems, various methods of supplying fuel gas to the anode electrode are known to include a technology to directly supply hydrogen gas from a hydrogen storage reservoir or a technology to reform hydrogen containing fuel for subsequently supplying resulting hydrogen containing gas. The hydrogen storage reservoir includes a high pressure gas tank, a liquefied hydrogen tank and a hydrogen occlusion alloy tank. Hydrogen containing fuel includes natural gas, methanol and gasoline. Oxygen containing gas to be supplied to the cathode electrode is generally comprised of air.

With such fuel cell systems, in order for the fuel cell to effectively utilize an electrolyte performance to enhance an electric power generating efficiency, the electrolyte layer must be maintained at an optimum humidified condition. To this end, there are some instances where the fuel cell includes s structure to humidify fuel gas and air to be introduced to the fuel cell.

Japanese Patent Application Laid-Open Publication No. H8-250130 discloses a fuel cell adapted to utilize pure water as cooling medium to humidify an electrolyte layer via a porous type bipolar plate.

When reforming fuel gas to produce hydrogen, further, there are some instances where water is utilized to be reformed. For example, when reforming methanol to produce hydrogen, hydrogen is obtained in a chemical formula (3).

$CH_3OH + H_2O \rightarrow 3H_2 + CO_2$ (3)

Thus, in order to apply the fuel cell to an automotive vehicle, an efficient water balance must be appropriately maintained within the fuel cell or the fuel cell system involving the reformer because of a variety of factors. For example, water lost from the fuel cell to cause a shortage of water may be replaced by pure water supplied to the fuel cell at regular intervals, resulting in a troublesome maintenance work and a serious deterioration in a serviceability of a fuel cell powered vehicle.

On the other hand, when operating the fuel cell, it produces heat. To this end, the fuel cell system includes a structure wherein coolant such as water is supplied to the fuel cell, with coolant being introduced to a cooling device utilizing a heat exchanger such as a radiator to radiate heat outside from the fuel cell. A heat amount being radiated outside the vehicle at this instant is subjected to various factors such as an atmospheric temperature and a vehicle speed.

Under such circumstances, if the generated heat amount of the fuel cell exceeds a heat amount to be radiated by the cooling device, then the temperature of the fuel cell raises, with a resultant difficulty in continuously operating the same. Thus, the fuel cell system is required to have a heat balance suitably maintained at an appropriate level.

Japanese Patent Application Lai-Open Publication No. H10-172599 discloses a technology to establish a water balance of a fuel cell system through a control of an operating pressure of a fuel cell. More particularly, in a case where the atmospheric temperature increases to cause the amount of water contained in exhaust gases discharged from the fuel cell system to increase with a resultant difficulty in maintaining an efficient water balance of an overall structure of the system, a control is performed for increasing the operating pressure of the fuel cell to reduce the amount of water discharged from the fuel cell.

SUMMARY OF THE INVENTION

However, according to extensive study conducted by the inventors of the present application, the above structure tends to collect water in a liquid phase from water contained in a gas phase in the exhaust gases while increasing the operating pressure of the fuel cell, causing heat of condensation of water to occur with a resultant increase in heat amount to be discharged outside the fuel cell system.

Thus, increasing the operating pressure of the fuel cell in order to improve the water balance provides a tendency to cause a trouble in satisfying the heat balance with a resultant difficulty in continuously operating the fuel cell.

The present invention has been completed with a view of the above studies in mind and has an object to provide a fuel cell system and a related control method which satisfies a water balance and heat balance of the fuel cell system while enabling a fuel cell to be efficiently operated.

According to one aspect of the present invention, a fuel cell system comprises: a fuel cell body; a hydrogen supply system supplying hydrogen containing gas to the fuel cell body; an oxygen supply system supplying oxygen containing gas to the fuel cell body; a cooling system adjusting the temperature of the fuel cell body; a water circulation system supplying water to humidify the fuel cell body and collecting water discharged from the fuel cell body; a generated heat amount calculating section calculating a generated heat amount of the fuel cell body; a cooling performance calculating section calculating a cooling performance of the cooling system; a temperature calculating section calculating a fuel cell temperature of the fuel cell body on the basis of the generated heat amount calculated with the generated heat amount calculating section and the cooling performance calculated with the cooling performance calculating section; a collected water amount calculating section calculating an amount of water collected from the water circulation system on the basis of the fuel cell temperature calculated with the temperature calculating section; and a collected water amount controlling section controlling the amount of collected water discharged from the fuel cell body on the basis of the amount of collected water calculated with the collected water amount calculating section.

Stated another way, a fuel cell system of the present invention comprises: a fuel cell body; hydrogen supply means for supplying hydrogen containing gas to the fuel cell body; oxygen supply means for supplying oxygen containing gas to the fuel cell body; adjusting means for adjusting the temperature of the fuel cell body; water circulation means for supplying water to humidify the fuel cell body and for collecting water discharged from the fuel cell body; generated heat amount calculating means for calculating a generated heat amount of the fuel cell body; cooling performance calculating means for calculating a cooling performance of the cooling means; temperature calculating means for calculating a fuel cell temperature of the fuel cell body on the basis of the generated heat amount calculated with the generated heat amount calculating means and the cooling performance calculated with the cooling performance calculating means; collected water amount calculating means for calculating an amount of water collected through the water circulation means on the basis of the fuel cell temperature calculated with the temperature calculating means; and collected water amount controlling means for controlling the amount of collected water discharged from the fuel cell body on the basis of the amount of collected water calculated with the collected water amount calculating means.

Besides in the present invention, a control method is applied to the fuel cell system which is provided with: a fuel cell body; a hydrogen supply system supplying hydrogen containing gas to the fuel cell body; an oxygen supply system supplying oxygen containing gas to the fuel cell body; a cooling system adjusting the temperature of the fuel cell body; and a water circulation system supplying water to humidify the fuel cell body and collecting water discharged from the fuel cell body. The control method comprises: calculating a generated heat amount of the fuel cell body; calculating a cooling performance of the cooling system; calculating a fuel cell temperature of the fuel cell body on the basis of the generated heat amount and the cooling performance: calculating an amount of water to be collected from the water circulation system on the basis of the fuel cell temperature; and controlling the amount of collected water discharged from the fuel cell body on the basis of the amount of collected water.

Other and further features, advantages, and benefits of the present invention will become more apparent from the following description taken in conjunction with the following drawings.

DETAILED DESCRIPTION OF THE PREFERRED EMBODIMENTS

To describe the present invention in more detail, preferred embodiments of a fuel cell system and a related control method according to the present invention will be described with reference to the accompanied drawings.

First Preferred Embodiment

A fuel cell system of a first preferred embodiment according to the present invention is described in conjunction with a related control method of the preferred embodiment with reference to FIGS. 1 to 8.

Figure 1:
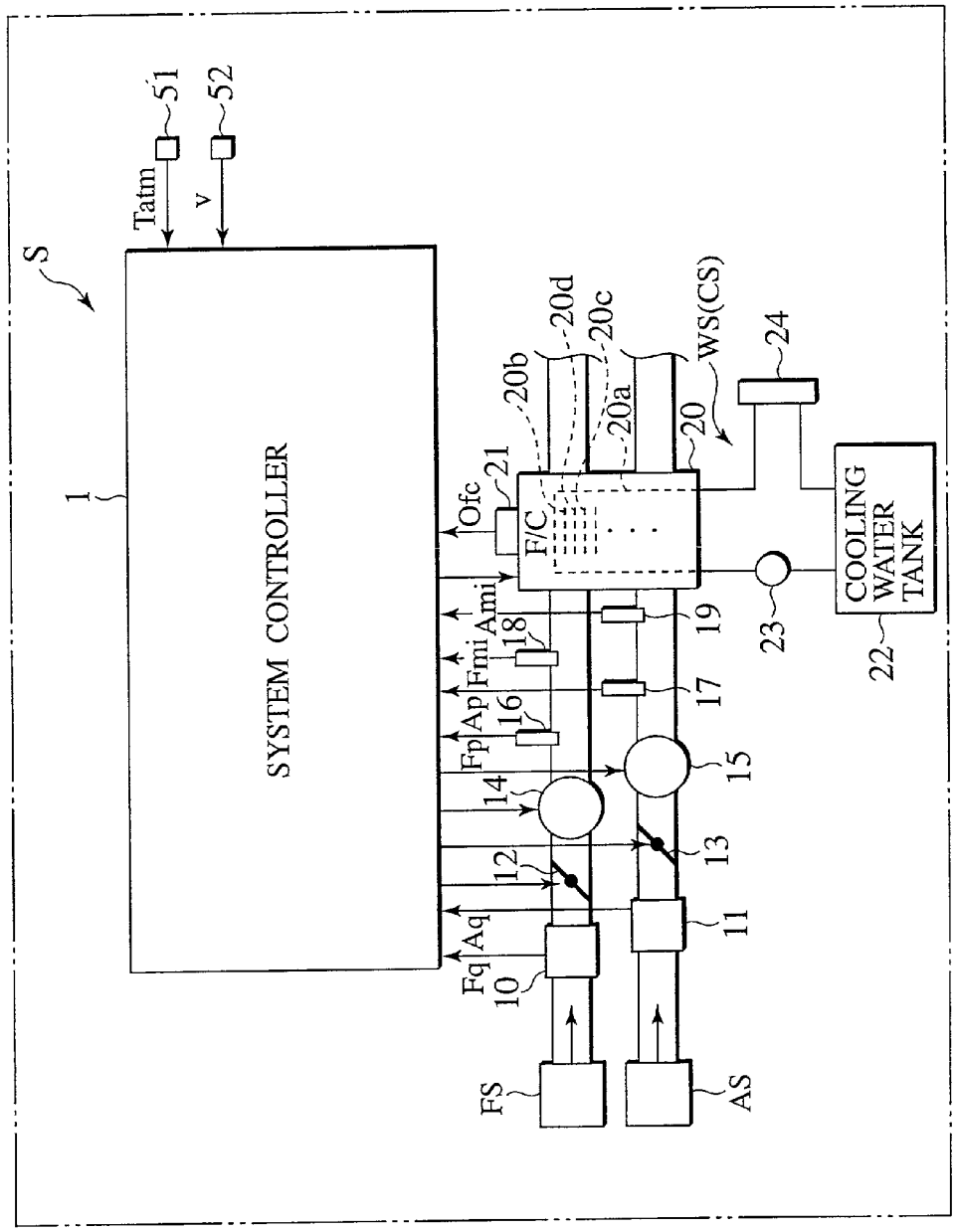
FIG. 1 is an overall structural view illustrating a fuel cell system of a first preferred embodiment according to the present invention.

FIG. 1 is an overall structural view showing the fuel cell system S of the first preferred embodiment.

In the presently filed preferred embodiment, the fuel cell system S includes a fuel cell body (which is also called as a fuel cell stack) which is shown as applied to a fuel cell powered vehicle FV and which has a humidifying function and a water colleting function, with pressures of gases to be introduced to the fuel cell body being controlled for thereby enabling the amount of water to be collected from the fuel cell system to be effectively controlled.

In order for the fuel cell body to be efficiently operated, the moisture content of an electrolyte film must be maintained at an appropriate value and hence the fuel cell system is comprised of a humidifying unit and a water collecting unit. Alternatively, however, it may be possible for the fuel cell system to take a structure which substantially contains the humidifying unit and the water collecting unit therein to perform the same purposes. With this view in mind, the preferred embodiment of the present invention is described below with reference to an example wherein the fuel cell system of the presently filed preferred embodiment has both functions of the humidifying unit and the water collecting unit inside the fuel cell body.

In FIG. 1, the fuel cell system S includes the fuel cell body 20 adapted to be supplied with fuel gas and air for electrochemical reaction to generate electric power, a fuel-flow meter 10 that detects the flow rate Fq of fuel gas flowing through a fuel supply passage of a fuel supply system, which is also provided with a fuel supply source FS and extends from the fuel supply source FS to the fuel cell body 20, an air-flow meter 11 that detects the flow rate Aq of air flowing through an air supply passage of a air supply system, which is also provided with an air supply source AS and extends from the air supply source AS to the fuel cell body 20, a fuel gas flow-rate control valve 12 that controls the flow rate of fuel gas being supplied to the fuel cell body 20, an air flow-rate control valve 13 that controls the flow rate of air being supplied to the fuel cell body 20, a compressor 14 which pressurizes fuel gas, to be supplied to the fuel cell body 20, to a desired level, a compressor 15 which pressurizes air, to be supplied to the fuel cell body, to a desired level, a pressure sensor 16 that detects pressure Fp of compressed fuel gas being supplied to the fuel cell body 20, a pressure sensor 17 that detects pressure Ap of compressed air being supplied to the fuel cell body 20, a moisture sensor 18 that detects moisture Fm of fuel gas being supplied to the fuel cell body 20, a moisture sensor 19 that detects moisture Am of compressed air being supplied to the fuel cell body 20, a fuel-cell operating condition detector 21 that detects output voltage, output current or electric power output representative of an operating condition Ofc of the fuel cell body 20, a cooling water tank 22 which stores cooling water therein, a cooling water pump 23 which circulates cooling water, a radiator 24 that radiates heat from cooling water to outside the fuel cell system, and a system controller 1 that controls the above components parts which form the system. Further, the fuel cell system also includes an atmospheric temperature sensor 51 that detects an atmospheric temperature Tatm outside the fuel cell system, i.e. the atmospheric temperature outside the fuel cell system within the fuel cell powered vehicle FV containing the same, and a vehicle speed sensor 52 that detects a vehicle speed v of the fuel cell powered vehicle FV which is mounted with the fuel cell system. Of course, in some instances, the atmospheric temperature sensor 51 may be so arranged as to detect the atmospheric temperature outside the fuel cell powered vehicle FV. Such an atmospheric temperature Tatm may also be utilized as respective gas temperatures (inlet temperatures) Fti, Ati of fuel gas and air to be supplied to a fuel electrode 20b and an air electrode 20c, respectively. Furthermore, the operating condition Ofc of the fuel cell body 20 may involve a temperature of a housing of the fuel cell body 20.

The fuel cell body 20 is internally formed with a cooling water passage 20a that enables transfer of cooling water to and from an electrically conductive porous member 20d formed either on the fuel electrode 20b or on the air electrode 20c or electrically conductive porous members 20d formed on both electrodes 20b, 20c for achieving the humidifying function and the water collecting function in addition to an inherent cooling function. Thus, the cooling water passage 20a, the cooling water tank 22, the cooling water pump 23 and the radiator 24 form a water circulation system WS which involves a humidifying system and a water collecting system and which also serves as a cooling system CS.

The cooling system CS (water circulation system WS) operates in a manner as described below.

The cooling water pump 23 draws cooling water from the cooling water tank 22 and delivers it to the cooling water passage 20a under pressure. The cooling water functions not only to absorb heat from the fuel cell body 20 during passing through the cooling water passage 20a but also to achieve transfer of water to and from the electrically conductive porous member 20d, formed either on the fuel electrode 20b or the air electrode 20c or the electrically conductive porous members 20d formed on both the electrodes 20b, 20c. And, after radiating heat outside the fuel cell system from the radiator 24, cooling water is returned to the cooling water tank 22 to be collected.

Figure 2:
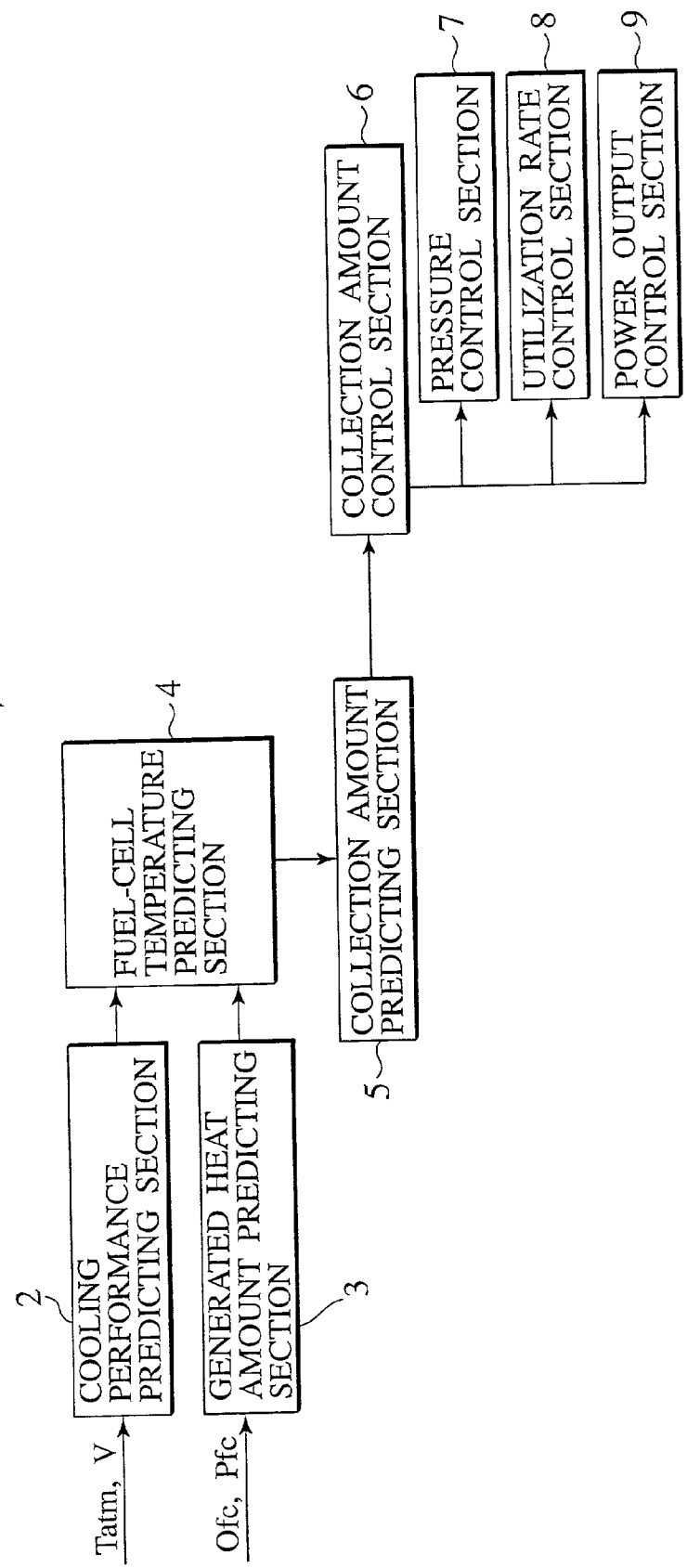
FIG. 2 is a block diagram illustrating a system controller forming part of the fuel cell system of the first preferred embodiment shown in FIG. 1.

In FIG. 2, the system controller 1 for controlling the fuel cell system is comprised of a cooling performance predicting (calculating) section 2 that predicts (calculates) a cooling performance representative of the amount of radiated heat in the cooling system CS, a generated heat amount predicting (calculating) section 3 that predicts (calculates) a heat amount generated in the fuel cell body 20 (heat value of the fuel cell body), a fuel cell temperature predicting (calculating) section 4 that predicts (calculates) the temperature of the fuel cell body 20 on the basis of the predicted cooling performance and the predicted heat amount, a collected water amount predicting (calculating) section 5 that predicts (calculates) the amount of water collected from the fuel cell body 20 on the basis of the predicted temperature of the fuel cell body 20, a collected water amount controlling section 6 that controls the amount of collected water on the basis of the predicted amount of collected water, a pressure controlling section 7 that controls the pressures of fuel gas and air by controlling the compressors 14,15, a utilization rate controlling section 8 that controls a utilization rate of fuel gas, and a power output controlling section 9 that controls a power output of the fuel cell body 20.

The system controller 1 contains, though not limited to particular specifications, a microcomputer that stores a control program which realizes functions of the cooling performance predicting section 2, the generated heat amount predicting section 3, the temperature predicting section 4, the collected water amount predicting section 5, the collected water amount controlling section 6, the pressure controlling section 7, the utilization rate controlling section 8 and the power output controlling section 9.

Now, the structure of the system controller 1 of the fuel cell system S of the preferred embodiment is described below in detail in conjunction with the operation of the same.

The cooling performance predicting section 2 of the system controller 1 is applied with an atmospheric temperature signal and a vehicle speed signal representative of the atmospheric temperature Tatm and the vehicle speed v delivered from the atmospheric temperature sensor 51 and the vehicle speed sensor 52, respectively, and predicts the cooling performance of the fuel cell system, i.e., especially the cooling performance of the fuel cell body 20, in response to the atmospheric temperature Tatm and the vehicle speed v.

Further, the generated heat amount predicting section 3 is applied with information signals representative of the operating condition Ofc of the fuel cell body 20 produced by the fuel cell operating condition detector 21, and pressure signals indicative of the pressure Fp of fuel gas and the pressure Ap of air delivered from the pressure sensors 16,17, respectively. Here, in consideration of the pressure Fp of fuel gas and the pressure Ap of air to be supplied to the fuel cell body 20 being substantially equal to one another when set up, the pressure Fp of fuel gas is utilized as the operating pressure Pfc of the fuel cell body 20. The generated heat amount predicting section 3 serves to predict the heat amount of the fuel cell system, especially the generated heat amount of the fuel cell body 20, on the basis of operating condition information Ofc and the operating pressure Pfc.

Furthermore, the fuel cell temperature predicting section 4 serves to predict the temperature of the fuel cell body 20 on the basis of the cooling performance and the generated heat amount both of which have been predicted.

Moreover, the collected water amount predicting section 5 serves to predict the amount of water collected from the fuel cell system, that is, the fuel cell body 20 on the basis of the predicted temperature of the fuel cell body 20.

And, the collected water amount controlling section 6 responds to the predicted amount of collected water and controls the pressures, i.e., the operating pressure Pfc, of fuel gas and air to be supplied to the fuel cell body 20 via the pressure controlling section 7 in order to realize collection of a demanded amount of water while satisfying a heat balance requirement. Also, the collected water amount controlling section 6 may be of the type which has a structure to control the utilization rate of fuel gas via the utilization rate controlling section 8 and to control the power output of the fuel cell body 20 via the power output controlling section 9, with a detail of such a structure being described below in detail in conjunction with second and latter preferred embodiments.

Now, the heat balance in the fuel cell system of the presently filed preferred embodiment, more particularly, the fuel cell body 20 is calculated with the collected water amount predicting section 5 in a manner as expressed by a formula (4):

$$Wrcyc = Wproduct + Fin + Ain - Fout - Aout \quad (4)$$

where Wrcyc=the amount of collected water,
Wproduct=the amount of reaction product water,
Fin=the amount of water introduced to the fuel electrode,
Ain=the amount of water introduced to the air electrode,
Fout=the amount of water discharged from the fuel electrode, and
Aout=the amount of water discharged from the air electrode.

And, in the case of the amount Wrcyc of collected water exceeding the value of 0 in the above formula (4), it is concluded that a water balance is maintained in the fuel cell system to establish the water balance.

Here, although the amount Wrcyc of collected water represents the amount of water collected immediately after the fuel cell body 20, it may be concluded that an amount of water actually collected in the cooling water tank 22 via the radiator 24 is treated as the amount of collected water. The amount Wproduct of reaction product water obtained in the fuel cell body 20 is derived by calculating the amount of water produced during electrochemical reaction using the operating condition Ofc of the fuel cell body 20, more particularly, an output electric energy (or an output electrical charge) that is a time integrated value of an output electric power (or an output electric current). The amounts Fin, Ain of water introduced to the fuel electrode 20b and the air electrode 20c are calculated based on the flow rates Fq, Aq, the pressures Fp, Ap, the inlet temperatures Fti, Ati and the inlet moistures Fmi, Ami of fuel gas and air being supplied to the fuel electrode 20b and the air electrode 20c. The amounts of water discharged from the fuel electrode 20b and the air electrode 20c are calculated based on the flow rates Fq, Aq and the pressures Fp, Ap of fuel gas and air to be supplied to the fuel electrode 20b and the air electrode 20c, respectively, and the outlet temperatures Fto, Ato and the outlet moistures Fmo, Amo of respective exhausts, with a pressure loss in the cooling water passage 20a being further considered in calculation. Of course, the above described respective amounts of water may be properly treated as respective values in terms of unit time.

In the presently filed preferred embodiment, further, while the pressures Fp, Ap of fuel gas and air to be supplied to the fuel electrode 20b and the air electrode 20c are detected using the sensors 16,17, these sensors may be dispensed with and these parameters may be predicted and obtained on the basis of the operating conditions of the compressors 14, 15, the opening degree of the fuel gas flow rate control valve 12 and the opening degree of the air flow rate control valve 13.

Further, while the atmospheric temperature Tatm is used as the inlet temperatures Fti, Ati of fuel gas and air to be supplied to the fuel electrode 20b and the air electrode 20c, respectively, for convenience's sake, in order to obtain a more accurate result, separate sensors may be located at positions in the vicinity of respective gas inlets to utilize detected values. On the other hand, while the outlet temperatures Fto, Ato of the exhausts discharged from the fuel electrode 20b and the air electrode 20c has been treated to be equal to the temperature of the housing of the fuel cell body 20, in order to obtain a more accurate result, separate sensors may be located at positions in the vicinity of respective gas outlets to utilize detected values. Also, it is to be noted that the temperature of the housing of the fuel cell body 20 is involved in the operating condition Ofc of the fuel cell body 20.

Further, the inlet temperatures Fmi, Ami of fuel gas and air to be supplied to the fuel electrode 20b and the air electrode 20c, respectively, are detected with the sensors 18, 19, respectively. On the other hand, while the outlet moistures Fmo, Amo of the exhausts discharged from the fuel electrode 20b and the air electrode 20c have been calculated using saturated steam pressure depending on the outlet temperatures Fto, Ato under an assumption that steam pressures associated with the respective outlet moistures are saturated, it may be of course possible for separate sensors to be located at areas close proximity to the respective gas outlets.

Figure 3:
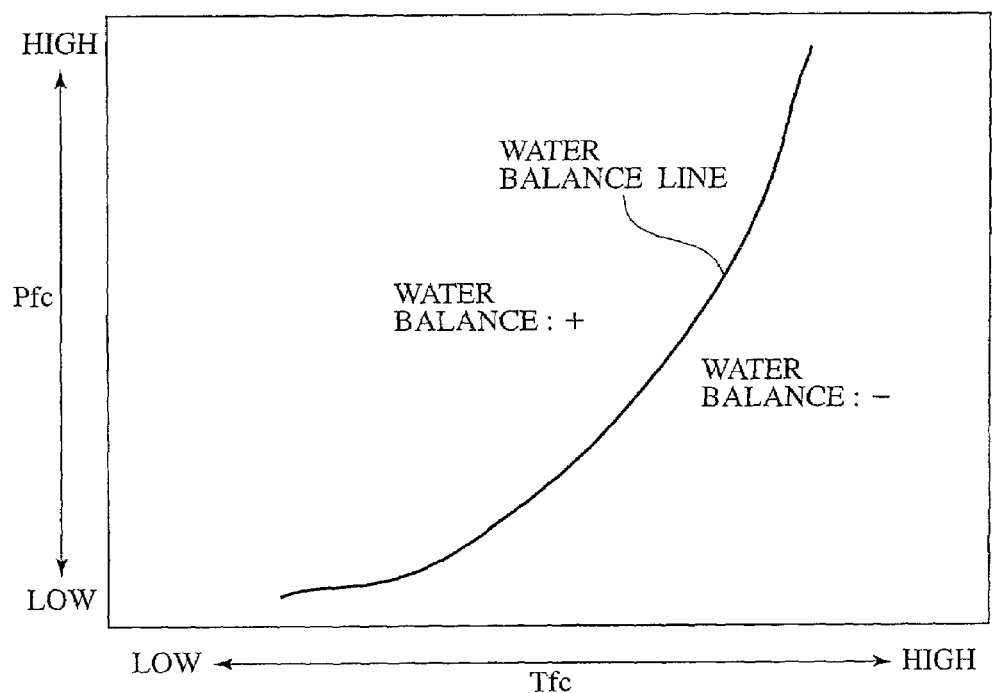
FIG. 3 is a graph illustrating a water balance line plotted in terms of a fuel cell temperature Tfc and an operating pressure Pfc of the fuel cell system of the first preferred embodiment shown in FIG. 1.

Further, FIG. 3 is a graph illustrating a water balance line obtained more particularly by using the formula (4) and representing a condition where the amount of water supplied to the fuel cell system and the amount of water consumed therein equal to one another with no excess and shortage.

This graph reveals that the operating pressure Pfc of the fuel cell body 20, which renders the water balance to be established, varies in response to the variation in the fuel cell temperature Tfc which can be treated as the temperature of the fuel cell body 20. In this respect, the fuel cell temperature Tfc can be calculated using the cooling performance and the generated heat amount of the fuel cell body 20 in a manner as previously set forth.

In FIG. 3, as the fuel cell temperature Tfc increases, a saturated steam pressure increases and hence the operating pressure Pfc, that causes the water balance to be balanced with no excess and shortage, with the water balance line being composed of a curve with a gradually increasing positive inclination contour. And, if the operating pressure Pfc is higher than the water balance line at a certain fuel cell temperature Tfc, the water balance then remains at a positive (+) value to allow the amount of water in the fuel cell system to increase. In contrast, if the operating pressure Pfc is lower than the water balance line, the water balance then remains at a negative (−) value to allow the amount of water in the fuel cell system to decrease.

Accordingly, in order to establish the water balance of the fuel cell system, the operating pressure Pfc must be controlled in response to the fuel cell temperature Tfc. Of course, the fuel cell system may be operated such that the operating pressure Pfc is slightly higher than the water balance line in order to ensure an operating margin.

Figure 4:
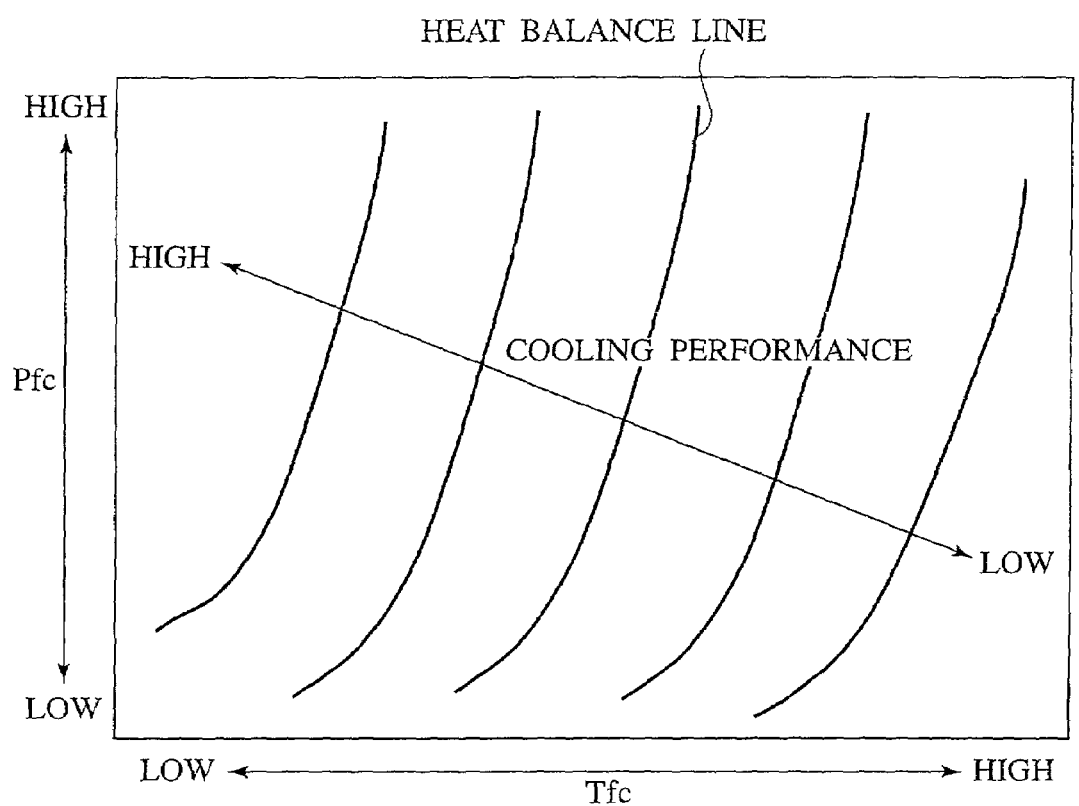
FIG. 4 is a graph illustrating heat balance lines plotted in terms of the fuel cell temperature Tfc and the operating pressure Pfc varying at respective cooling performances of the fuel cell system of the first preferred embodiment shown in FIG. 1.

On the other hand, FIG. 4 shows various heat balance lines that have characteristics wherein the respective heat balance lines are obtained in accordance with the cooling performances of the cooling system CS, respectively. On a particular heat balance line, there exists a condition where the heat amount generated in the fuel cell system equals the heat amount radiated from the same on the assumption that the cooling performance is obtained.

In FIG. 4, in the same cooling performance, in order to maintain the heat balance with no excess and shortage, if the fuel cell temperature Tfc becomes high, it is required to decrease the generated heat amount by increasing the operating pressure Pfc, when the fuel cell temperature Tfc becomes high, to increase the electric power generating efficiency of the fuel cell body 20 and hence the respective heat balance lines are typically described on curves with gradually increasing positive inclinations. And, assuming that the fuel cell temperature Tfc remains constant, if the operating pressure Pfc is higher than the heat balance line, then the heat balance assumes a negative value to decrease the heat amount of the fuel cell system. On the contrary, if the operating pressure Pfc is lower than the heat balance line, then the heat balance assumes a positive value to increase the heat amount of the fuel cell system. The heat balance lines are correspondingly concentrated toward a left side of the graph as the cooling performance becomes higher and correspondingly concentrated toward a right side of the graph as the cooling performance is lowered.

Figure 5:
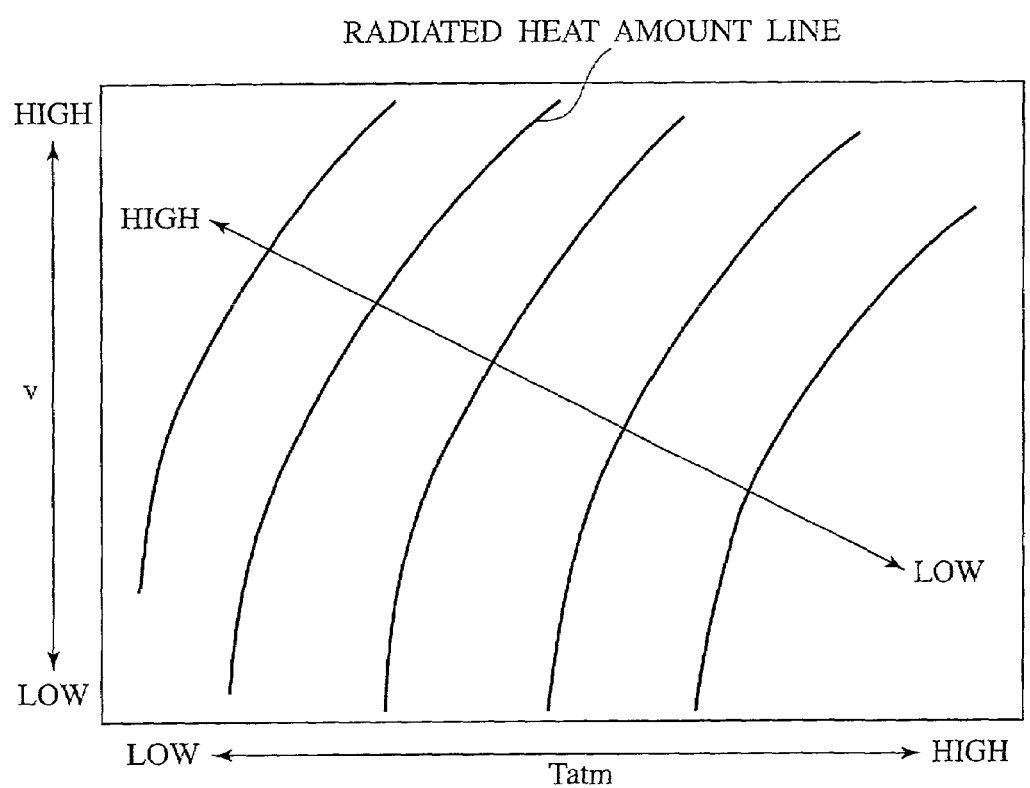
FIG. 5 is a graph illustrating radiated heat amount lines plotted in terms of an atmospheric temperature Tatm and a vehicle speed v of the fuel cell system of the first preferred embodiment shown in FIG. 1.

Further, FIG. 5 shows various radiated heat amount lines plotted in terms of the cooling performance, i.e. the heat amount radiated from the radiator 24 per unit time upon consumption that the fuel cell temperature Tfc remains constant. The radiated heat amount lines are composed of so-called contour lines representative of the radiated heat amounts, respectively.

In FIG. 5, in order for the radiated heat amount to remain constant in each of the respective radiated heat amount lines, the vehicle speed v must be increased to increase the radiated heat amount of the radiator 24 as the atmospheric temperature Tatm increases and hence the radiated heat amount lines are typically composed of curves with gradually decreasing positive inclinations. Also, there is a relationship in the radiated heat amount lines in that the lower the atmospheric temperature Tatm and the higher the vehicle speed v, the larger will be the radiated heat amount of the radiator 24, and hence the radiated heat amount lines indicate larger radiated heat amounts as they move toward the left. Thus, the preparation of the map shown in FIG. 5 enables the cooling performance of the fuel cell body 20, i.e. the radiated heat amount thereof to be predicted on an assumption that the fuel cell temperature Tfc remains constant.

In the presently filed preferred embodiment, further, while the radiator 24 is supposed to include a naturally air-cooled radiator, the radiator may be mounted with an electrically driven radiator fun when the fuel cell system is mounted in a case where the vehicle has a large electric power consumption at a low running speed.

Figure 6:
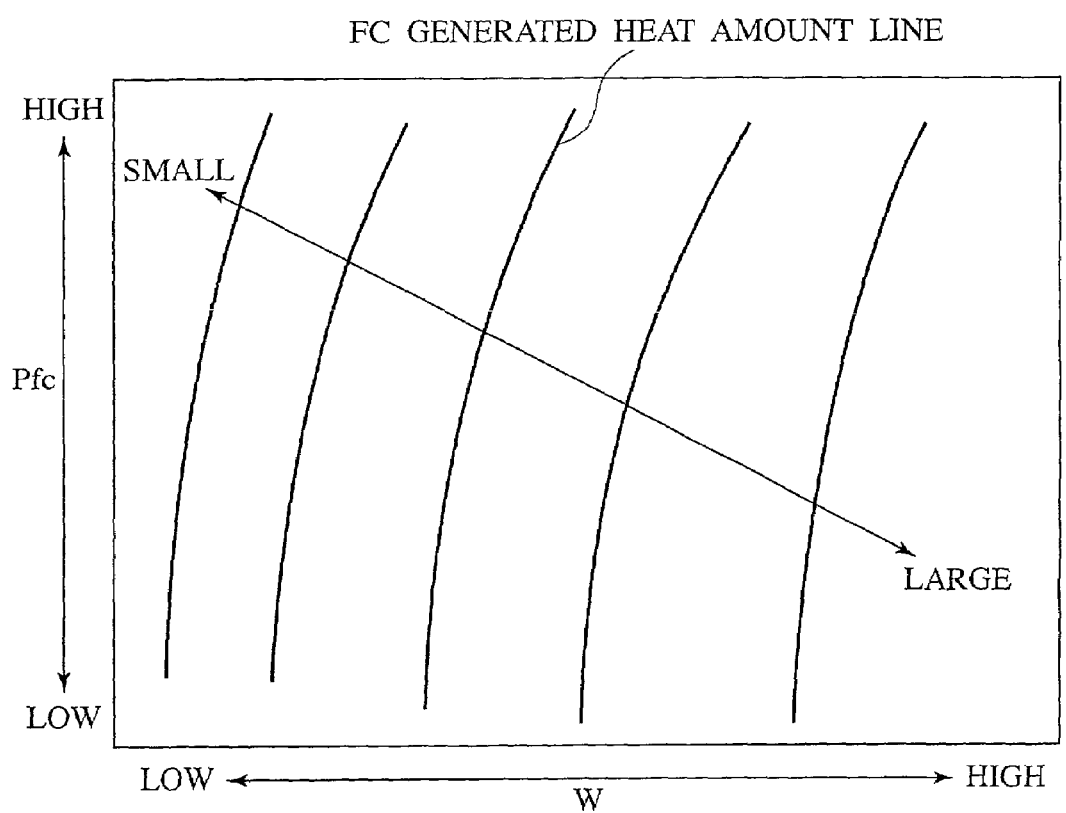
FIG. 6 is a graph illustrating generated heat amount lines plotted in terms of a fuel cell load W and the operating pressure Pfc of the fuel cell system of the first preferred embodiment shown in FIG. 1.

Further, FIG. 6 illustrates various fuel-cell generated heat amount lines representative of the heat amounts of the fuel cell body 20 generated per unit time. Also, each of the fuel-cell generated heat amount lines is composed of a so-called contour line of each generated heat amount.

In FIG. 6, in order for the generated heat amount of the fuel cell body 20 to remain constant in each of the respective generated heat amount lines, it is required to increase the operating pressure Pfc to decrease the generated beat amount because the generated heat amount of the fuel cell body 20 increases as the load (the power output) increases, and hence the generated heat amount lines are typically composed of curves with gradually decreasing positive inclinations. Also, there is a relationship in the respective generated heat amount lines in that the generated heat amount of the fuel cell body decreases as the load W decreases and decreases as the operating pressure Pfc increases thereby to increase the electric power generating efficiency. Thus, the generated heat amount lines show increasing generated heat amounts as they move toward the left in FIG. 6. Accordingly, the preparation of the map shown in FIG. 6 enables the generated heat amounts to be predicted.

As a consequence, upon finding the load W of the fuel cell body 20, the operating pressure Pfc, the atmospheric temperature Tatm and the vehicle speed v, not only the generated heat amount of but also the radiated heat amount of the fuel cell body 20 can be calculated, thereby enabling prediction of the fuel cell temperature Tfc that causes the heat amounts to be balanced with no excess and shortage.

Figure 7:
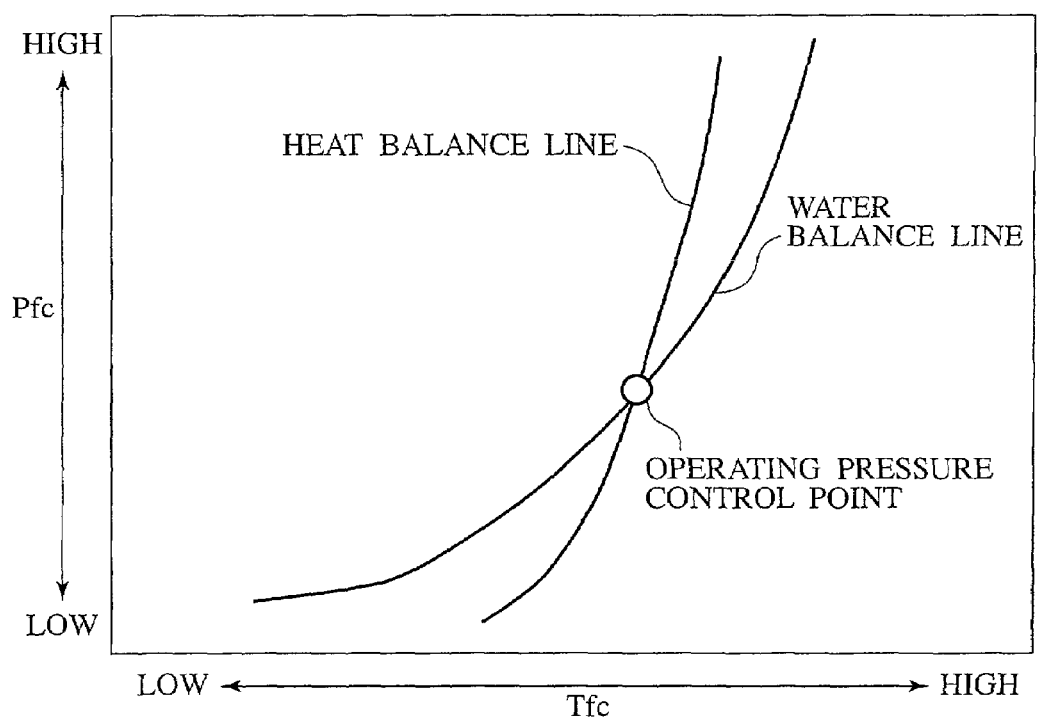
FIG. 7 is a graph illustrating a pressure control point provided in consideration of the water balance and the heat balance of the fuel cell system of the first preferred embodiment shown in FIG. 1.

Further, FIG. 7 shows a control pressure point of the operating pressure Pfc to cause the water balance and the heat balance to be established in the fuel cell system.

In FIG. 7, the value of the operating pressure Pfc remaining at a point wherein the water balance line shown in FIG. 3 and the heat balance line shown in FIG. 4 intersects with one another is aligned with the operating pressure control point that simultaneously satisfies the water balance line and the heat balance line.

Thus, according to the method discussed above, it is possible to calculate the operating pressure control point of the operating pressure Pfc to be determined such that the water balance and the heat balance are simultaneously satisfied in the fuel cell system. Of course, the control point of the operating pressure Pfc may be determined to a slightly higher level than the balancing point between the water balance and the heat balance to provide an operating margin. However, although the presence of the operating pressure Pfc settled to the slightly higher level provides an advantage for the water balance, the presence of the operating pressure settled to an excessively higher level causes condensation heat of water to increase such that the heat balance is lost with a resultant increase in the temperature of the fuel cell body 20. This results in deterioration of performance of the electrolyte film of the fuel cell body 20 to cause a difficulty in continuous operation of the fuel cell body 20 and, hence, the operating pressure control point must be preferably determined to remain in a proper range.

Now, a further detailed operation of the system controller 1 of the fuel cell system of the preferred embodiment is described below in detail.

Figure 8:
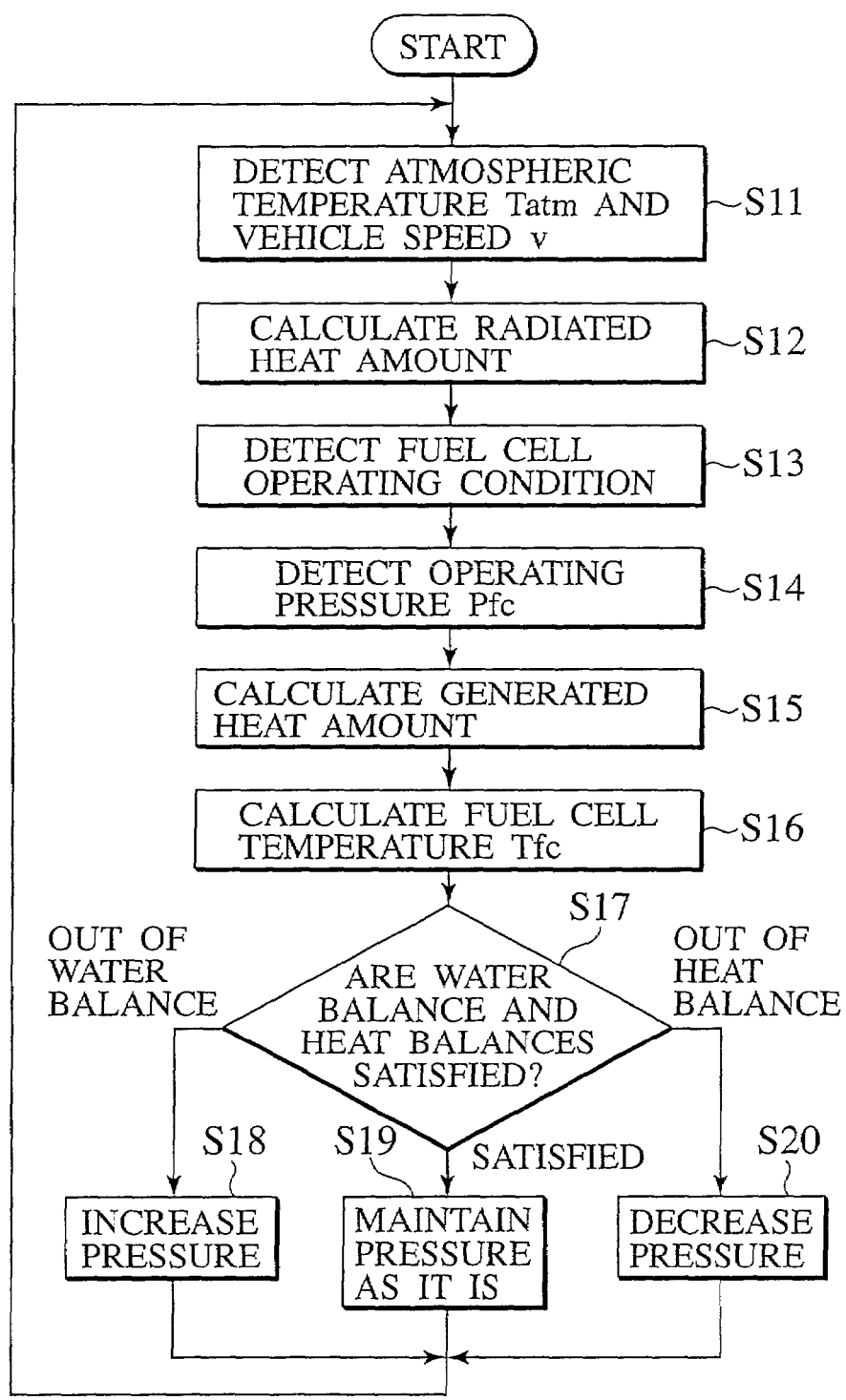
FIG. 8 is a control flow chart illustrating a basic concept of operation of the fuel cell system of the fuel cell system of the first preferred embodiment shown in FIG. 1.

FIG. 8 shows a control flow chart for realizing a control method of the operating pressure of the system controller 1.

As shown in FIG. 8, first in step S11, the atmospheric temperature Tatm and the vehicle speed v are detected with the atmospheric temperature sensor 51 and the vehicle speed sensor 52, respectively.

In consecutive step S12, the cooling performance predicting section 2 responds to the atmospheric temperature Tatm and the vehicle speed v and calculates the radiated heat amount of the fuel cell body 20 using the map shown in FIG. 5.

In subsequent step S13, the fuel cell operating condition detector 21 detects the operating condition Ofc of the fuel cell body 20. The operating condition Ofc involves information related to the load (output power) W of the fuel cell body 20.

In step S14, the pressure sensor 16 detects the operating pressure Pfc of the fuel cell body 20.

In step S15, the generated heat amount predicting section 3 responds to the load W and the operating pressure Pfc of the fuel cell body 20 and calculates the generated heat amount of the fuel cell body 20 using the map shown in FIG. 6.

In consecutive step S16, the fuel cell temperature predicting section 4 responds to the radiated heat amount and the generated heat amount of the fuel cell body 20 and calculates the fuel cell temperature Tfc. Also, in order to calculate the fuel cell temperature Tfc, the relationship between the radiated heat amount and generated heat amount of the fuel cell body 20 and the fuel cell temperature Tfc is preliminarily obtained to prepare a relational formula and a related map, which in turn may be utilized in a subsequent calculation. Also, with a view to further improving a calculation accuracy, the fuel cell temperature Tfc may be calculated using not only the radiated heat amount and generated heat amount of the fuel cell body 20 but also the amount of collected water calculated with the collected water amount predicting section 5 in a previous operating routine.

In step S17, the water balance line and the heat balance line are obtained using the maps shown in FIGS. 3 and 4, and an intersecting point between the water balance line and the heat balance line shown in FIG. 7 is obtained, with the collected water amount predicting section 5 comparing the value of the operating pressure Pfc corresponding to such intersecting point, i.e. the value of the operating pressure control point corresponding to the value of the operating pressure Pfc to be determined, and the detected value of the operating pressure Pfc detected in step S14 to discriminate whether the detected value of the operating pressure Pfc remains in an allowable range of the value of the operating pressure control point, i.e., in a target range. Such a target range of the operating pressure control point may be determined to remain in a given range in consideration of an allowable tolerance in the water balance and the heat balance that can be accepted in actual practice. Further, settlement of such an operating pressure control point leads to a meaning in that calculation is implemented for the amount of collected water to establish the water balance under a condition to establish the heat balance in the fuel cell body 20.

Here, upon judgment in that the detected operating pressure Pfc remains in the target range of the operating pressure control point, i.e., both the water balance and the heat balance remain in the respective target ranges, the operation goes to step S19 where the pressure controlling section 7 of the collected water amount controlling section 6 maintains the compressors 14,15 in their previous operating states with no changes to maintain the operating pressure Pfc in its previous level, and the operation returns to step S11.

In contrast, when it is judged that the operating pressure Pfc remains in the target range of the heat balance but does not remain in the target range of the water balance, i.e., the heat balance remains in the target range whereas the water balance does not remain in the target range, i.e., the water balance is regarded to remain in the minus range, the operation goes to step S18 where the pressure controlling section 7 of the collected water amount controlling section 6 controls the compressors 14, 15 to slightly increase the operating pressure Pfc by a given value for increasing the amount of product water to improve the water balance, and the operation returns to step S11.

On the other hand, further, when it is judged that the operating pressure Pfc remains in the target range of the water balance but does not remain in the target range of the heat balance, i.e., the heat balance is regarded to remain in the minus range, the operation goes to step S20 where the pressure controlling section 7 of the collected water amount controlling section 6 controls the compressors 14, 15 to slightly decrease the operating pressure Pfc by a given value for increasing the generated heat amount of the fuel cell body 20 to improve the heat balance, and the operation returns to step S11.

Also, the operations set forth above are begun when the fuel cell system is operated and cease when the operation of the fuel cell system is terminated.

Furthermore, the various maps are preliminarily stored in a memory, not shown, of the system controller 1 and are used in the operations discussed above.

Second Preferred Embodiment

Now, a fuel cell system of a second preferred embodiment and a related method according to the present invention are described below in detail with reference to FIGS. 9 to 11. The fuel cell system of the second preferred embodiment has the same fundamental structure as that of the first preferred embodiment, with the exception of a structure for detecting the amount of cooling water. The same component parts as those of the first preferred embodiment bear the same reference numerals as used therein and a detailed description of the same is herein omitted.

Figure 9:
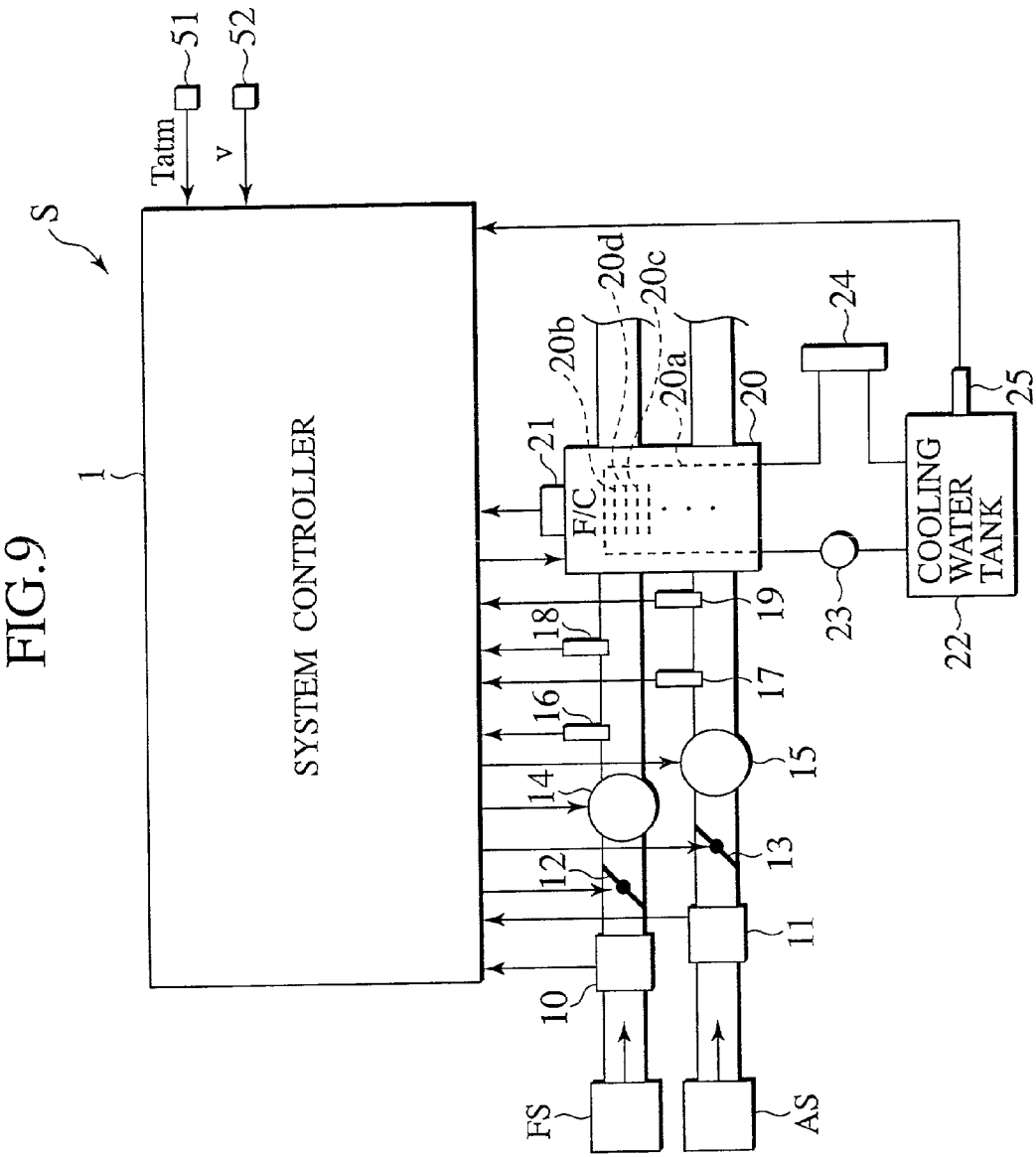
FIG. 9 is an overall structural view of a fuel cell system of a second preferred embodiment according to the present invention.

FIG. 9 shows an overall structure of the fuel cell system of the second preferred embodiment.

As shown in FIG. 9, the fuel cell system of the second preferred embodiment has the same structure as that of the first preferred embodiment with the exception for a water level sensor 25 additionally mounted to the cooling water tank 22 for detecting the amount of cooling water.

More particularly, the second preferred embodiment concerns a feature in that the pressure control point of the operating pressure Pfc is varied in response to the water level of the cooling water tank 22 detected with the water level sensor 25. For example, in an event that the fuel cell system remains inoperative for a long period of time, it happens that, owing to leakage of steam, the water level of the cooling water tank 22 is lowered to a value out of a given proper range. To address such an issue, the presently filed preferred embodiment features to allow the water level of the cooling water tank 22 to be restored to its proper level within a shortened period by permitting the pressure controlling section 7 of the collected water amount controlling section 6 of the system controller 1 to control the compressors 14, 15 such that the operating pressure Pfc is further increased to a level higher than the value that establishes the water balance.

Figure 10:
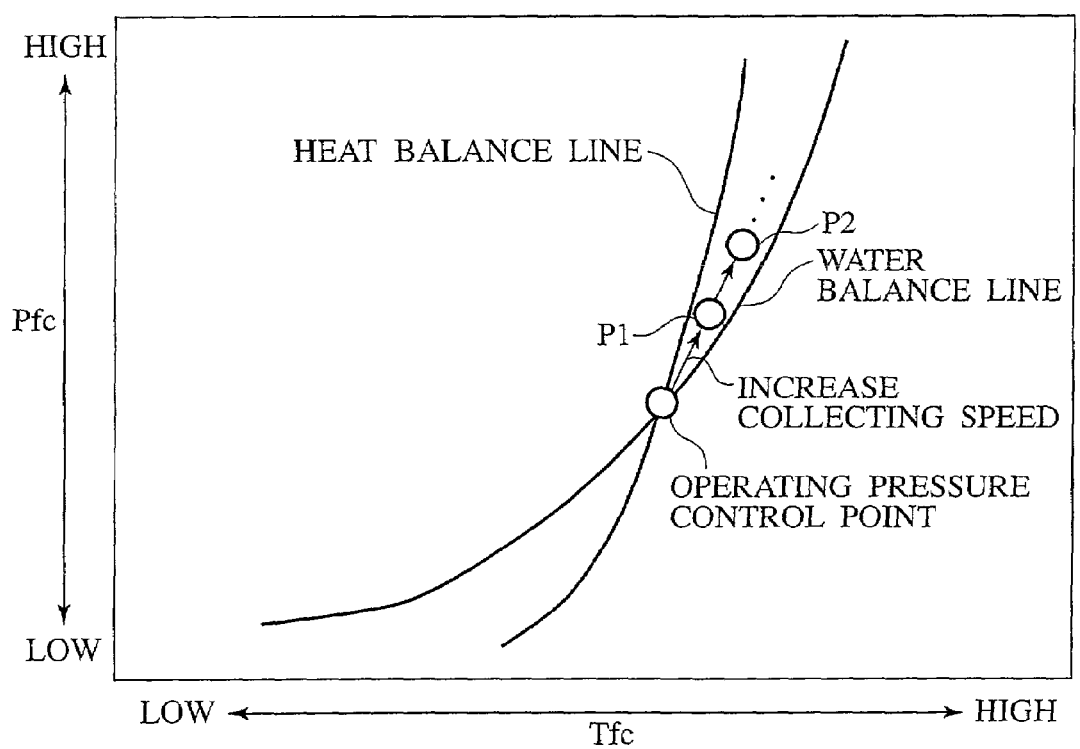
FIG. 10 is a graph illustrating a pressure control point provided in consideration of the water balance and the heat balance of the fuel cell system of the second preferred embodiment shown in FIG. 9.

FIG. 10 shows a graph illustrating a concept for controlling the operating pressure of the fuel cell system of the presently filed preferred embodiment.

In FIG. 10, in a case where the water level of the cooling water tank 22 remains in the given proper range, the pressure control point may be obtained at the intersecting point between the water balance line and the heat balance line that establish the water balance and the heat balance in the same manner as in the first preferred embodiment. In contrast, if the water level of the cooling water tank 22 does not remain in the given range, the pressure controlling section 7 of the collected water amount controlling section 6 controls the compressors 14, 15 to allow the operating pressure Pfc to increase in response to a difference between the current water level of the cooling water tank 22 and a lower limit of the proper range of the water level of the cooling water tank 22, thereby newly setting the operating pressure control point to allow the operating pressure Pfc to be suitably shifted from points P1, P2 . . . such that the water balance has the positive values for thereby increasing a water-collecting speed. Such a control enables the water level of the cooling water tank 22 to be restored to its proper range within the shortened period.

Also, the target range of the operating pressure control point to be newly determined may be settled to lie in the given range in the same manner as in the first preferred embodiment in consideration of allowable tolerances in the water balance and the heat balance that can be accepted in actual practice.

Figure 11:
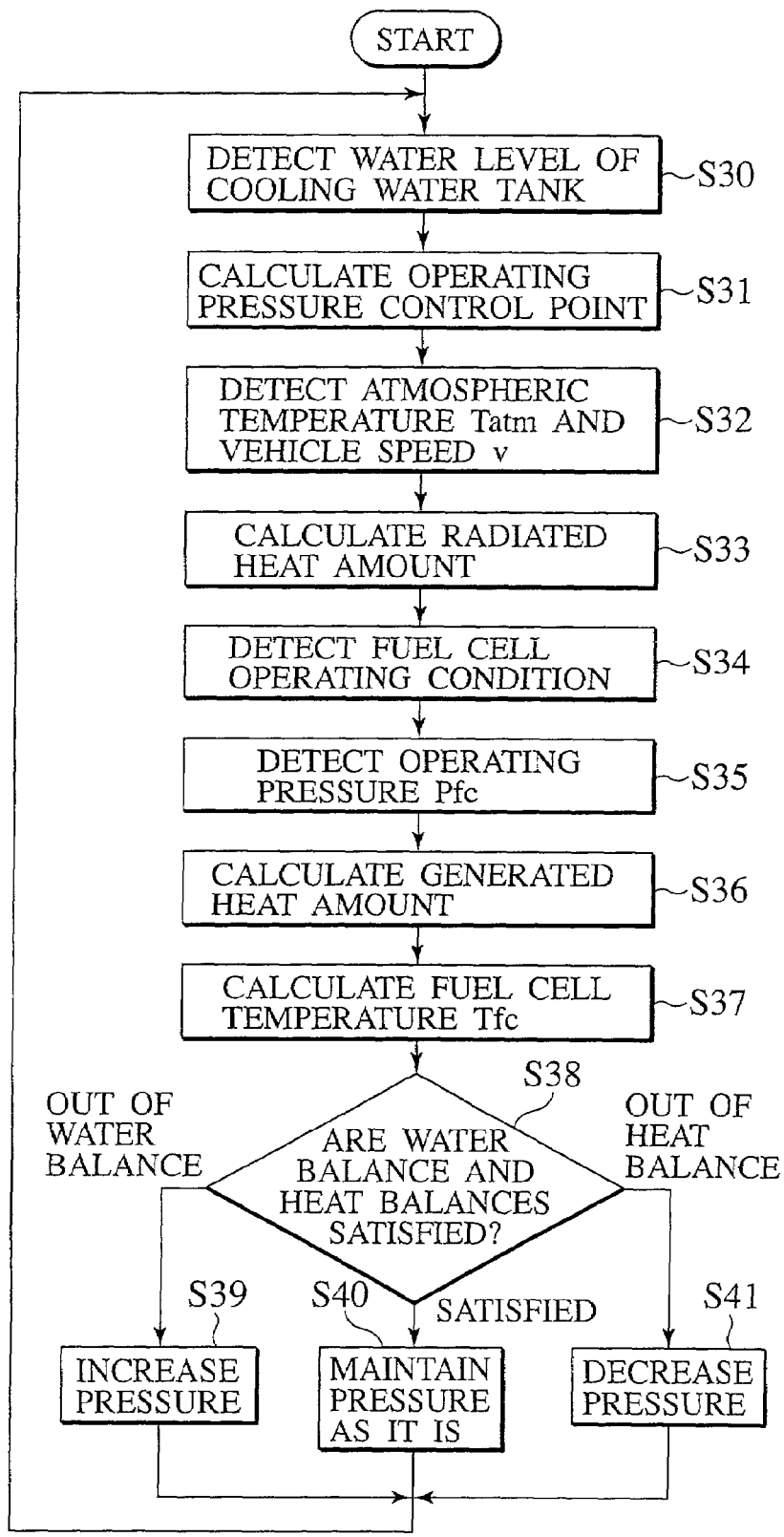
FIG. 11 is a control flow chart illustrating a basic concept of operation of the fuel cell system of the second preferred embodiment shown in FIG. 9.

FIG. 11 is a control flow chart for illustrating the basic sequence of operation of the fuel cell system of the second preferred embodiment. The control flow chart of the presently filed preferred embodiment is substantially similar to that of the first preferred embodiment shown in FIG. 8, with the exception of operation wherein, prior to execution of step S11 of FIG. 8, the water level of the cooling water tank 22 is detected and the operating pressure control point is newly calculated, with such a difference being focused below to describe the flow chart of the presently filed embodiment.

In FIG. 11, first in step S30, the water level sensor 25 detects the water level of the cooling water tank 22.

In subsequent step S31, referring to the control map shown in FIG. 10, operating pressure control points P1, P2 . . . are newly calculated in response to the difference between the current water level of the cooling water tank 22 and the lower limit of the proper range of the water level of the cooling water tank 22.

The operations subsequent to step S32 are carried out in the same manner as in the operations subsequent to step 111 of the first preferred embodiment shown in FIG. 8. However, in step S38, the operating pressure Pfc to be settled is determined to be the operating pressure control point (if it is P1, then P1 is selected) newly obtained in step S31, enabling a comparison between the value of such operating pressure control point and the detected value of the operating pressure Pfc to discriminate whether the heat balance remains in the target range and whether the water balance remains in the target range whereupon the operations of the first preferred embodiment are similarly carried out in sequence.

Third Preferred Embodiment

Now, a fuel cell system of a third preferred embodiment and related method of the present invention are described below in detail with reference to FIGS. 12 to 14. The fuel cell system of the presently filed embodiment is fundamentally identical in structure as that of the first preferred embodiment, with the exception for a structure wherein, in the presently filed preferred embodiment, a so-called gas utilization rate is employed as a parameter to establish the water balance and the heat balance whereas, in the first preferred embodiment, the operating pressure has been employed as a parameter to establish the water balance and the heat balance. The same component parts as those of the first preferred embodiment bear the same reference numerals as those used therein and a detailed description of the same component parts are herein omitted. In the presently filed preferred embodiment, also, since the fuel cell system is of the type that controls the gas utilization rate, the system controller 1 of the third preferred embodiment shown in FIG. 13 contains the utilization rate controlling section 8 of the collected water amount controlling section 6 shown in FIG. 2.

Here, the gas utilization rate Ufc, that is employed in the presently filed preferred embodiment, is correlated with the amount of fuel gas consumed in electrochemical reaction in the fuel cell body 20 and is expressed in a formula (5) described below using the flow rate Hin of fuel gas to be supplied to the fuel cell body 20 per unit time and the flow rate Hout of fuel gas discharged from the fuel cell body 20 per unit time. When the gas utilization rate increases, the amount of fuel gas being discharged from the fuel cell body 20 is decreased, with a resultant decrease in the amount of water being discharged from the fuel cell body 20 to satisfy the water balance. Also, the flow rate Hin of fuel gas to be supplied to the fuel cell body 20 per unit time is calculated using the fuel gas flow rate Fq detected with the fuel flow meter 10 located in the fuel supply passage leading from the fuel supply source FS to the fuel cell body 20. Further, the flow rate Hout of fuel gas discharged form the fuel cell body 20 per unit time is calculated using the fuel gas exhaust flow rate Fqo detected with the exhaust flow meter 60 which will be described below.

$$Ufc = (Hin - Hout)/Hin \quad (5)$$

Figure 12:
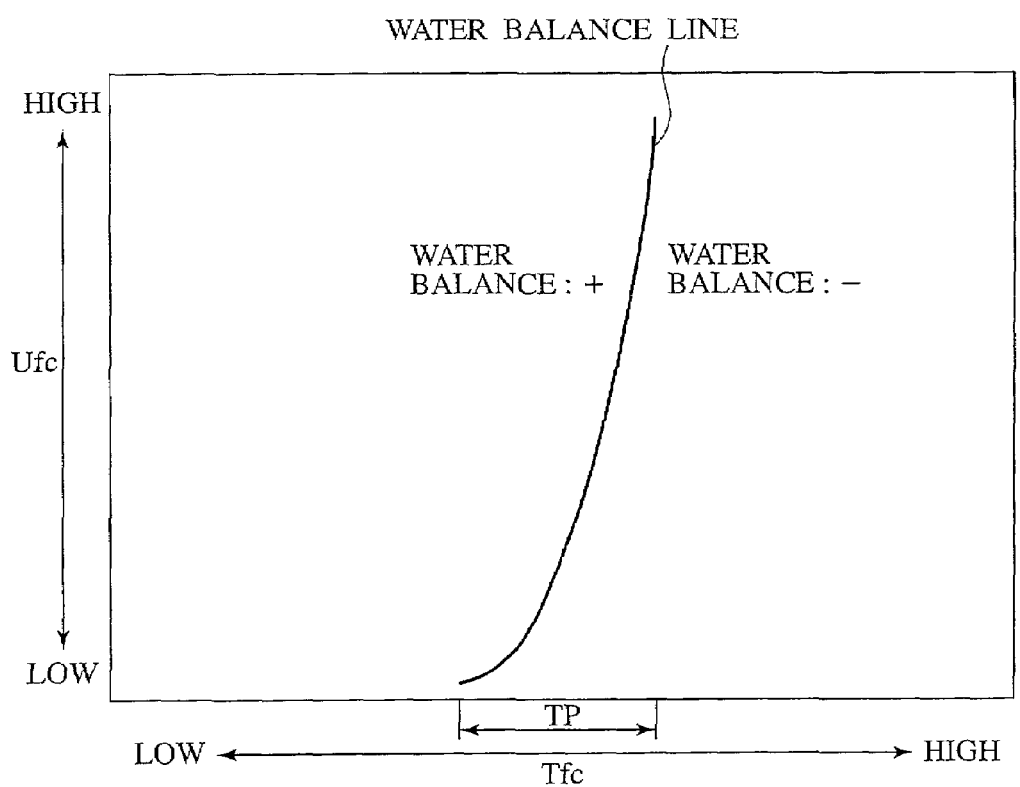
FIG. 12 is a graph illustrating a water balance line plotted in terms of the fuel cell temperature Tfc and the gas utilization rate Ufc of a fuel cell system of a third preferred embodiment according to the present invention.

FIG. 12 sows a water balance line in a case where the fuel cell temperature Tfc and the gas utilization rate Ufc are varied.

In FIG. 12, in case of the fuel cell temperature Tfc remaining within a particular range of Tp, the higher the fuel cell temperature Tfc, the higher will be the gas utilization rate Ufc that causes the water balance to be satisfied with no excess and shortage, with the water balance line being composed of a curve having a gradually increasing positive inclination. And, if the gas utilization rate Ufc is higher than the water balance line at a particular fuel cell temperature Tfc, the water balance takes the positive (+) value to allow the amount of water in the fuel cell system to increase. In contrast, if the gas utilization rate Ufc is lower than the water balance line, the water balance takes the negative (−) value to allow the amount of water in the fuel cell system to decrease. That is, the presence of the fuel cell temperature Tfc remaining within the range of Tp enables the gas utilization rate Ufc to be controlled for thereby causing the water balance to be satisfied.

Figure 13:
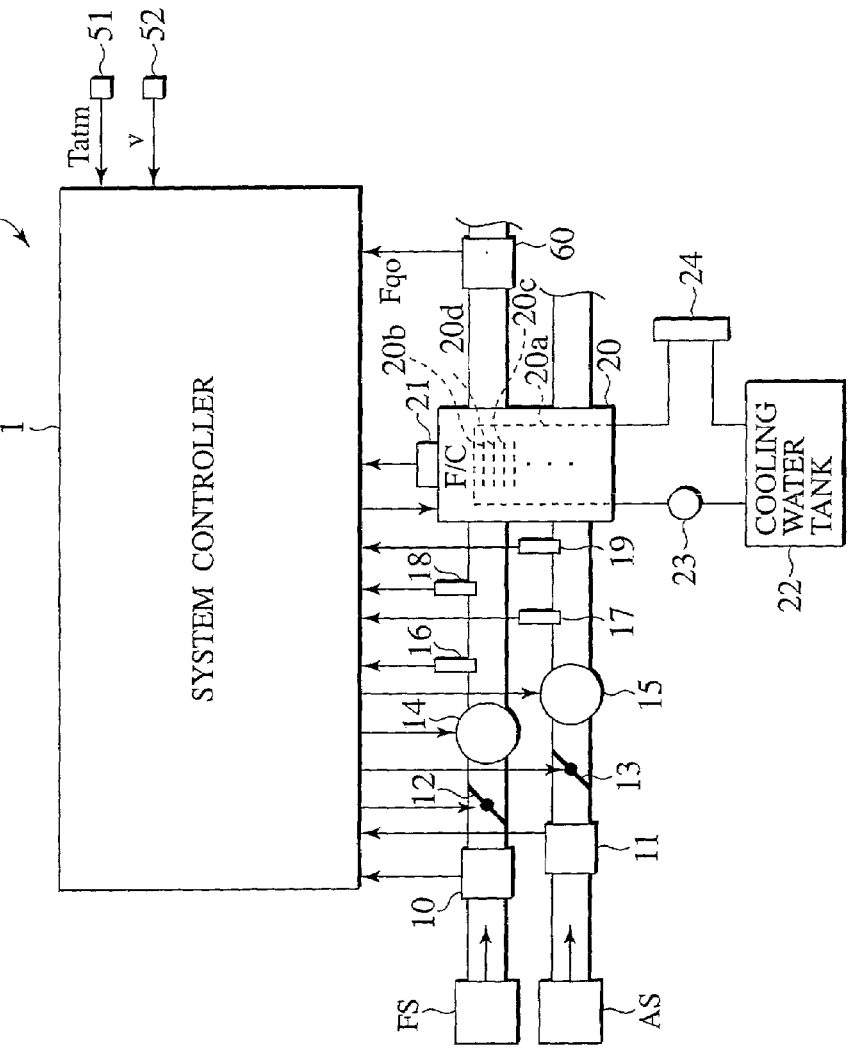
FIG. 13 is an overall structural view of the fuel cell system of the third preferred embodiment.

FIG. 13 shows an overall structure of the fuel cell system of the presently filed preferred embodiment.

As shown in FIG. 13, the fuel cell system of the third preferred embodiment is identical in structure to the first preferred embodiment, with the exception for that the exhaust flow meter 60 is additionally located at a downstream side of the fuel cell body 20 to detect the flow rate Fqo of fuel gas discharged from the same. Using the exhaust flow rate Fqo of fuel gas detected with the exhaust flow meter 60 allows the flow rate Hout of fuel gas discharged from the fuel cell body 20 per unit time to be obtained, with the flow rate Hout of fuel gas being used with the flow rate Hin of fuel gas to be supplied to the fuel cell body 20 per unit time obtained by using the flow rate Fq of fuel gas detected with the fuel flow meter 10 for calculating the gas utilization rate Ufc. Also, the collected water amount predicting section 5 of the system controller 1 shown in FIG. 2 serves to calculate the gas utilization rate Ufc when discriminating the water balance.

With such a feature, the adoption of the structure, wherein the gas utilization rate is controlled for establishing the water balance, causes the efficiency of the fuel cell body 20 to be increased as in the structure of the first preferred embodiment where the operating pressure Pfc is controlled using the compressors 14, 15. However, there is no phenomenon that induces a decrease in an overall efficiency of the fuel cell system that would otherwise occur when drive work of the accessories such as the compressors 14, 15 is increased. That is, as in the presently filed preferred embodiment, in an event that the fuel cell temperature Tfc remains in a particular range to allow control of the water balance using the gas utilization rate, it is advisable to use the gas utilization rate in order to improve the overall efficiency of the fuel cell system. Alternatively, in consideration of a possible occurrence where the water balance can not be controlled with the gas utilization rate, it is of course not objectionable to employ a selective structure wherein, in such an occurrence, the control of the gas utilization rate is interrupted and, in stead thereof, the operating pressure is controlled.

Figure 14:
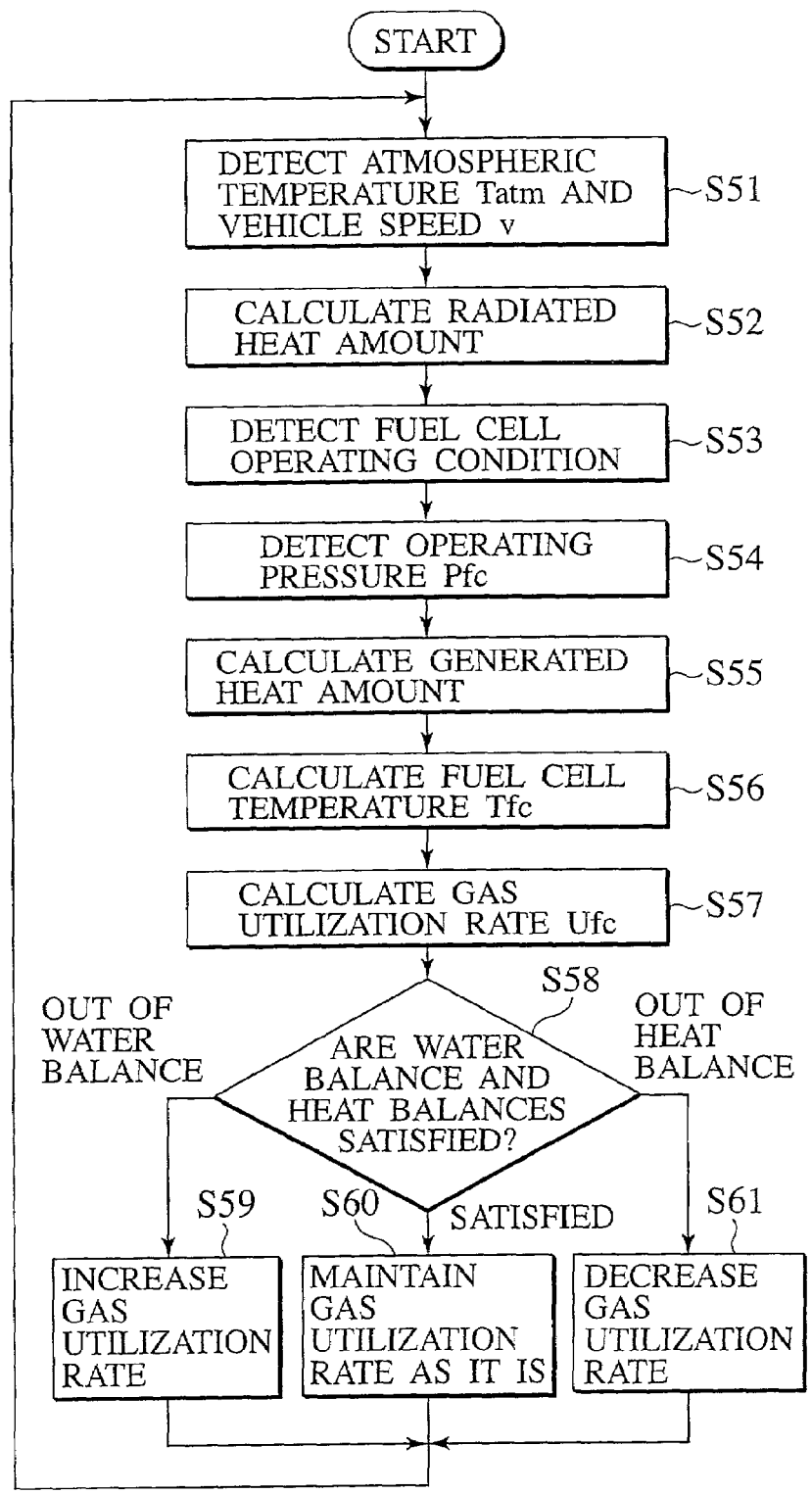
FIG. 14 is a control flow chart illustrating a basic concept of operation of the fuel cell system shown in FIG. 13.

FIG. 14 is a control flow chart for illustrating the basic sequence of operation of the fuel cell system of the presently filed preferred embodiment. The control flow chart of the presently filed embodiment is approximately similar to the control flow chart of the first preferred embodiment shown in FIG. 8 except for that the fuel cell system is operated using the coefficient of gas utilization in place of the operating pressure Pfc, with such a difference being focused below when describing the flow chart of the presently filed preferred embodiment.

In FIG. 14, the control flow chart includes the same control flow covering from step S51 wherein the atmospheric temperature Tatm and the vehicle speed v are detected to step S56 wherein the fuel cell temperature Tfc is calculated as that covering from step S11 to step S16 of FIG. 8 related to the first preferred embodiment.

In consecutive step S57, the gas utilization rate Ufc of fuel gas is calculated. Such a gas utilization rate Ufc is calculated in the above formula (5) with the collected water amount predicting section 5, with step S57 involving step of detecting the fuel gas flow rate Fq with the fuel flow meter 10 with a view to obtaining the flow rate Hin of fuel gas to be supplied to the fuel cell body 20 per unit time and step of detecting fuel gas exhaust flow rate Fqo with the exhaust flow meter 60 with a view to obtaining the flow rate Hout of fuel to be discharged from the fuel cell body 20 per unit time.

In subsequent step S58, the collected water amount predicting section 5 discriminates whether the water balance and the heat balance are satisfied in a similar manner as step S17 in the control flow chart of FIG. 8 related to the first preferred embodiment. In the presently filed preferred embodiment, however, calculation for the water balance line is implemented by using the map shown in FIG. 12, and calculation for the heat balance line is executed by using a map shown in FIG. 4, used for the first preferred embodiment, with the axis of ordinates being modified to read the gas utilization rate Ufc in place of the operating pressure Pfc.

Here, when it is judged that both the water balance and the heat balance are satisfied to lie in the target range, the operation goes to step S60 where the utilization rate controlling section 8 of the collected water amount controlling section 6 is maintained in a fixed operation to cause the gas utilization rate Ufc of the fuel cell body 20 to remain unchanged, and the operation returns to step S51.

On the contrary, when it is judged that the heat balance remains in its target range whereas the water balance is out of the target range, i.e., when the water balance remains in the minus (−) range, the operation goes to step S59 where the utilization rate controlling section 8 of the collected water amount controlling section 6 operates to increase the gas utilization rate Ufc by a given value to improve the water balance, and the operation returns to step S51.

On the other hand, when it is judged that the water balance remains in its target range whereas the heat balance is out of the target range, the operation goes to step S61 where the utilization rate controlling section 8 of the collected water amount controlling section 6 operates to decrease the gas utilization rate Ufc by a given value to improve the heat balance, and the operation returns to step S51.

Fourth Preferred Embodiment

Now, a fuel cell system of a fourth preferred embodiment and a related method according to the present invention is described below in detail mainly with reference to FIG. 15. An overall structure of the presently filed preferred embodiment is fundamentally identical with that of the first preferred embodiment but differs in that the presently filed preferred embodiment concerns a structure wherein the power output of the fuel cell body is used as a parameter for establishing the water balance and the heat balance whereas the first preferred embodiment concerns a structure wherein the operating pressure of the fuel cell body is employed as the parameter for establishing the water balance and the heat balance. The same component parts of the structure of the fourth preferred embodiment bear the same reference numerals as those of the structure of the first preferred embodiment and hence a detailed description of the same is herein omitted. Also, in the presently filed preferred embodiment, since the power output of the fuel cell body is controlled, the fuel cell system employs the power output controlling section 9 of the collected water amount controlling section 6.

In particular, as shown in FIG. 6 described in conjunction with the first preferred embodiment, as the output (power output) representative of the load W of the fuel cell body 20 decreases, the generated heat amount of the fuel cell body 20 decreases. This enables the temperature of the fuel cell body 20 to be decreased, resulting in an increase in the water balance. Further, when decreasing the output of the fuel cell body 20, the generated heat amount of the fuel cell body 20 is lowered and the operating temperature is thus decreased to decrease the heat balance such that not only the water balance and the heat balance are satisfied. However, although there are some instances where demanded values fall short of the output of the fuel cell body 20, such a shortage must be appropriately augmented with power output of an electric storage device such as a secondary battery cell or a bank of capacitors.

Figure 15:
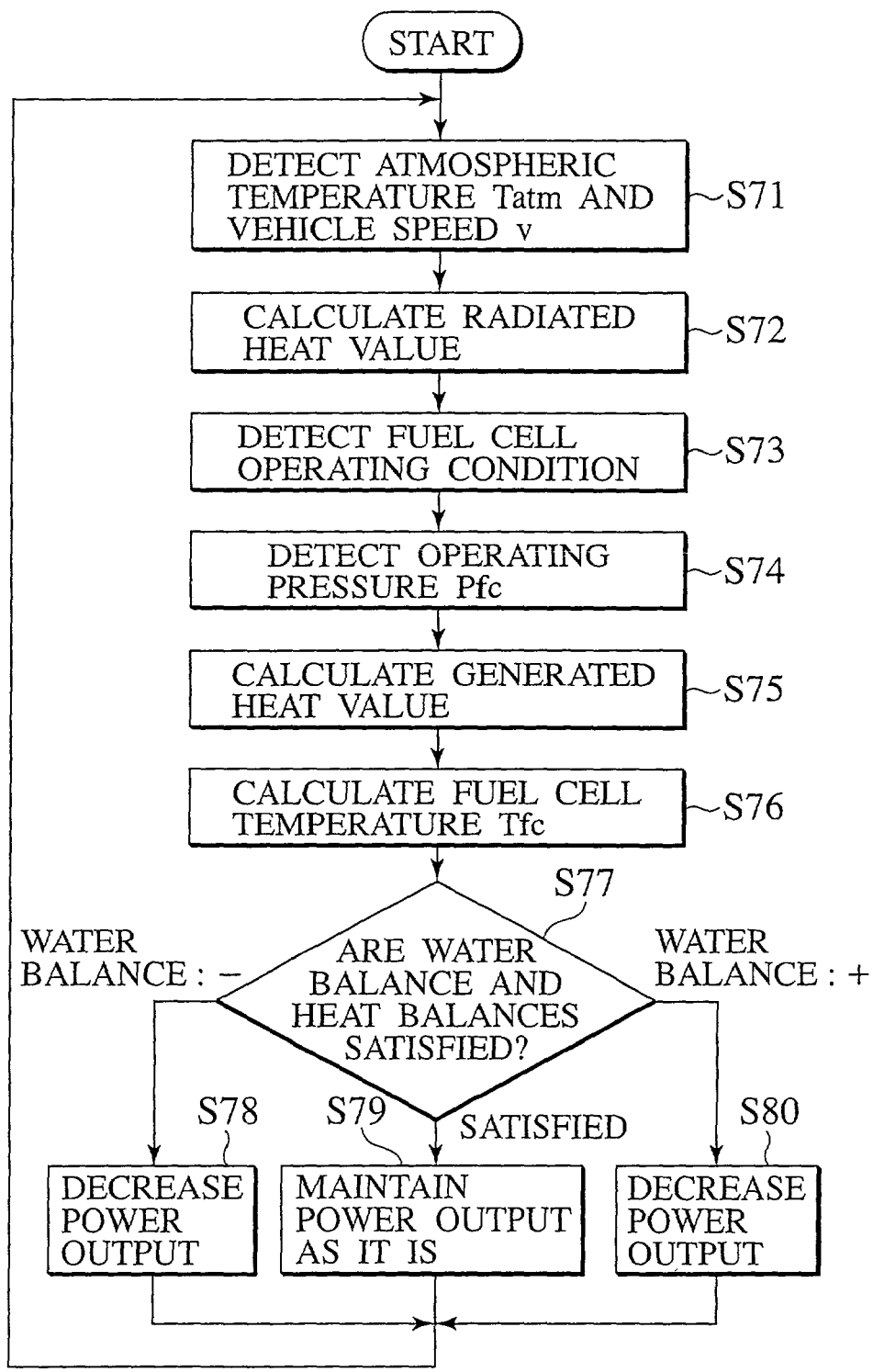
FIG. 15 is a control flow chart illustrating a basic concept of operation of a fuel cell system of a fourth preferred embodiment according to the present invention.

FIG. 15 is a control flow chart for illustrating the basic sequence of operation of the fuel cell system of the presently filed preferred embodiment. The control flow chart of the presently filed preferred embodiment is approximately similar to that of the first preferred embodiment except for that calculation is implemented using the output representing the load W of the fuel cell body 20 in place of the operating pressure Pfc, with such a difference being focused to describe the flow chart of the presently filed preferred embodiment.

In FIG. 15, the operation is carried out with the same control flow covering from step S71 for detecting the atmospheric temperature Tatm and the vehicle speed v to step S76 for calculating the fuel cell temperature Tfc as that covering from step S11 to step S16 shown in FIG. 8 described in conjunction with the first preferred embodiment.

In consecutive step S77, the collected water amount predicting section 5 discriminates whether the water balance and the heat balance are satisfied in the same manner as step S17 of FIG. 8 related to the first preferred embodiment.

Here, when it is judged that both the water balance and the heat balance remain in a balanced target range, the operation goes to step S79 wherein the output controlling section 9 of the collected water amount controlling section 6 maintains the output of the fuel cell body 20 to remain unchanged, and the operation returns to step S71.

On the contrary, when it is judged that the water balance remains in the minus (−) range and does not remain in its target range, the operation goes to step S78 where the output controlling section 9 of the collected water amount controlling section 6 operates to decrease the output of the fuel cell body 20 by a given value to lower the temperature of the fuel cell body 20 to improve the water balance, and the operation returns to step S71. Also, in such a case, if it is judged that the heat balance remains in the positive value and does not remain in the target range, the heat balance is also improved.

On the other hand, when it is judged that the water balance is positive and does not remain in its target range, the operation goes to step S80 where the output controlling section 9 of the collected water amount controlling section 6 operates to increase the output of the fuel cell body 20 by a given value, in contrary to the operation executed in step S79, and the operation returns to step S51. Also, in such a case, if it is judged that the heat balance is negative and does not remain in the target range, the heat balance is also improved.

Fifth Preferred Embodiment

Now, a fuel cell system of a fifth preferred embodiment and a related method according to the present invention is described below in detail mainly with reference to FIGS. 16 to 18. An overall structure of the presently filed preferred embodiment is fundamentally identical with that of the first preferred embodiment but differs in that the first preferred embodiment concerns a structure wherein the operating pressure of the fuel cell body is used as a parameter for establishing the water balance and the heat balance whereas the presently filed preferred embodiment concerns a structure wherein the operating pressure of the fuel cell body and the so-called gas utilization rate are employed in combination as parameters for establishing the water balance and the heat balance to maximize a system efficiency (energy efficiency) of the fuel cell system. The same component parts of the structure of the fifth preferred embodiment bear the same reference numerals as those of the structure of the first preferred embodiment and hence a detailed description of the same is herein omitted. Also, in the presently filed preferred embodiment, the "gas utilization rate" has the same meaning as that defined in the third preferred embodiment.

Figure 16:
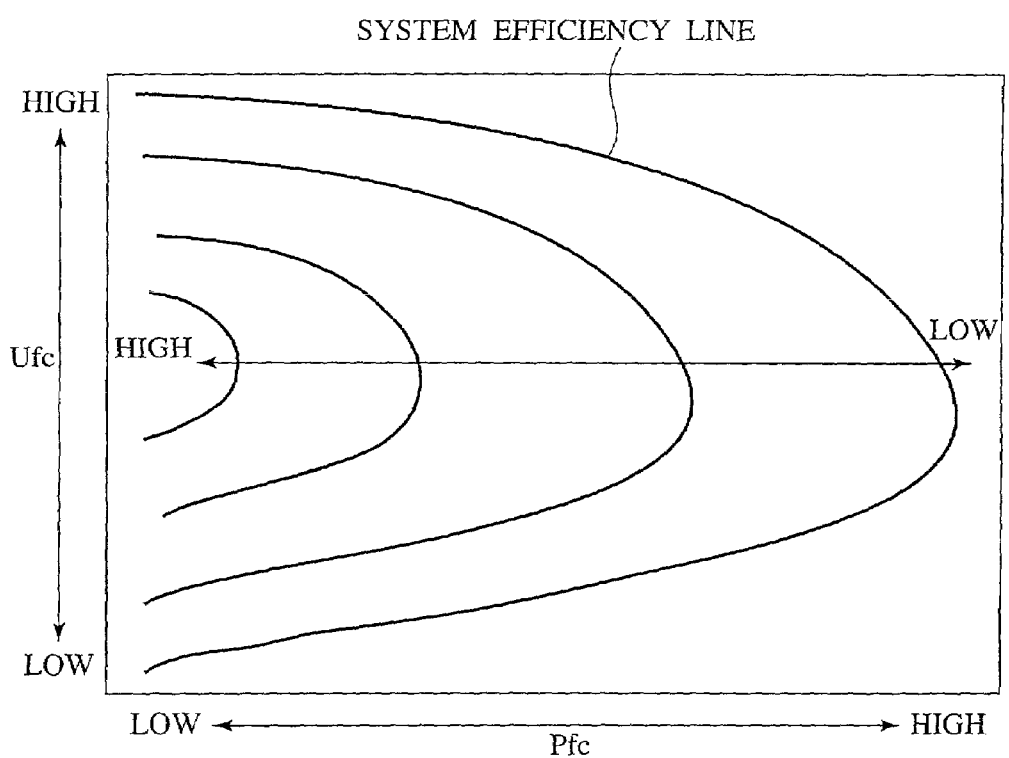
FIG. 16 is a graph illustrating system efficiency lines plotted in terms of the operating pressure Pfc and the gas utilization rate Ufc of a fuel cell system of a fifth preferred embodiment according to the present invention.

In particular, FIG. 16 shows respective system's efficiency lines plotted in terms of the operating pressure of the fuel cell body 20 and the coefficient of gas utilization. Also each of the respective system's efficiency lines is composed of a so-called contour line representing the system efficiency (energy efficiency) of the fuel cell system.

Here, when the operating pressure Pfc of the fuel cell body 20 is increased, drive work of the accessory units such as the compressors 14, 15 increases, tending to decrease the system efficiency of the fuel cell system per se. In contrast, when the gas utilization rate Ufc increases, the amount of gas to be wastefully discharged is minimized, providing a tendency of increasing the system efficiency. However, if the gas utilization rate Ufc further increases beyond a certain appropriate value, then a so-called concentrated overpotential of the fuel cell body 20 increases, with a resultant deterioration in the system efficiency. Thus, it is concluded that there exists a particular value of the gas utilization rate to achieve an optimum system efficiency. The respective system efficiency lines shown in FIG. 16 show such characteristics.

Figure 17:
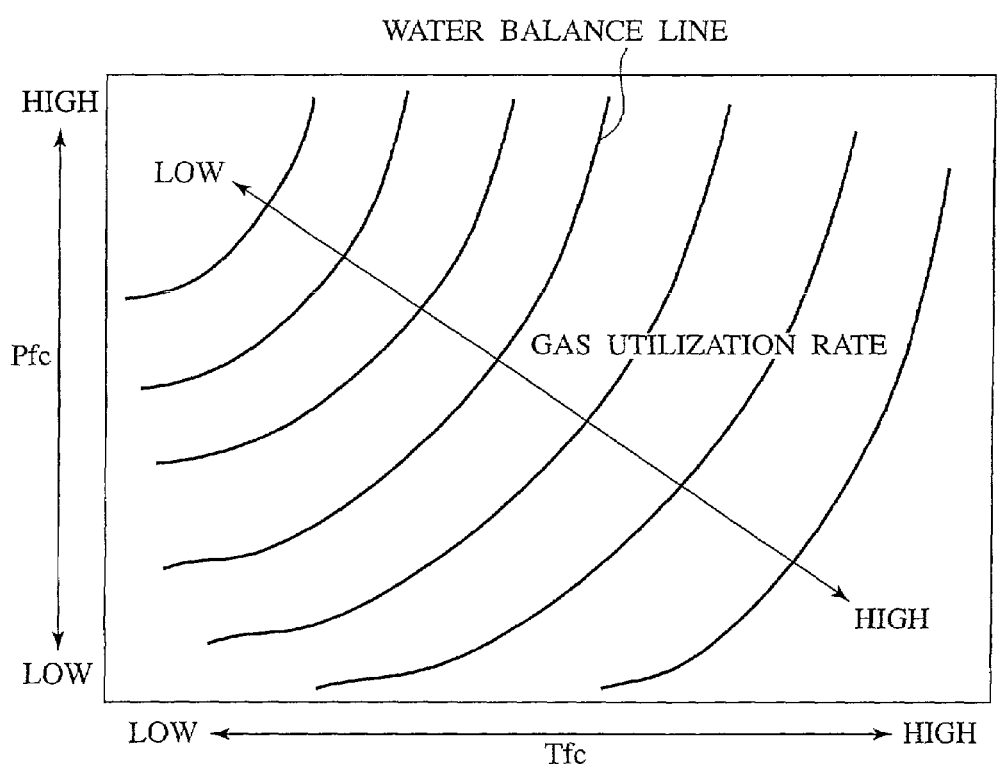
FIG. 17 is a graph illustrating heat balance lines plotted in terms of the fuel cell temperature Tfc and the operating pressure Pfc at respective coefficients of gas utilization of the fuel cell system of the fifth preferred embodiment.

Further, FIG. 17 shows the respective water balance lines that are plotted in terms of the fuel cell temperature Tfc, the operating pressure Pfc and the coefficient Ufc of gas utilization, with the water balance being established on one of the respective water balance lines in response to various operating conditions. In FIG. 17, as the gas utilization rate Ufc becomes larger and the operating pressure Pfc becomes higher, there is a characteristic that establish the water even under a condition wherein the fuel cell temperature Tfc remains at a high level.

Thus, when taking the characteristics shown in FIGS. 16 and 17 into consideration, it is understood that a particular combination of the coefficient of utilization and the pressure may be obtained to enable the water balance and the heat balance to be satisfied.

Figure 18:
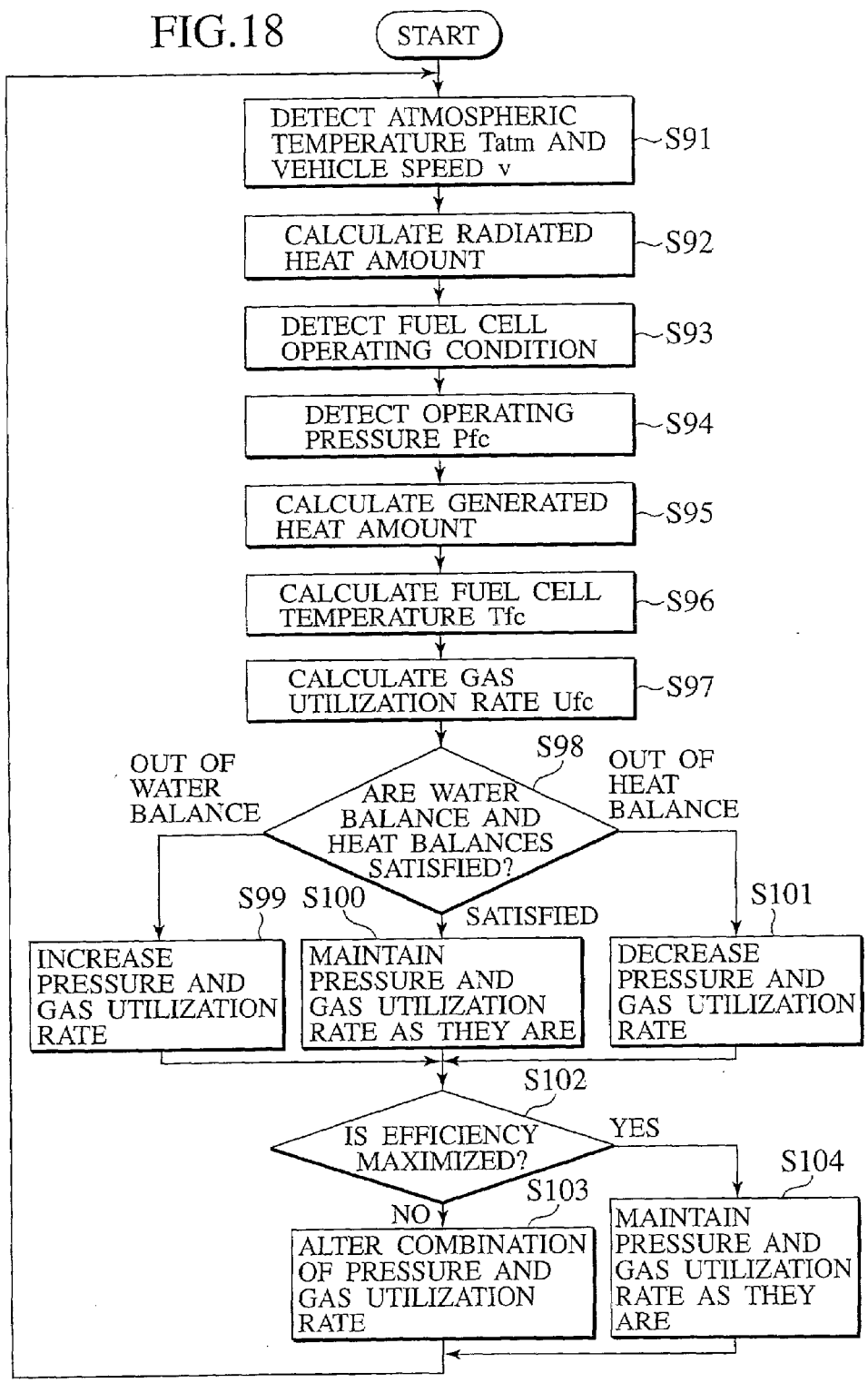
FIG. 18 is a control flow chart illustrating a basic concept of operation of the fuel cell system of the fifth preferred embodiment.

FIG. 18 is a control flow chart for illustrating the basic sequence of operation of the fuel cell system of the presently filed preferred embodiment. The control flow chart of the presently filed preferred embodiment is approximately similar to that of the first preferred embodiment shown in FIG. 8 except for that calculation is implemented using not only the operating pressure Pfc but also the gas utilization rate Ufc, with such a difference being focused to describe the flow chart of the presently filed preferred embodiment.

In FIG. 18, the operation is carried out with the same control flow covering from step S91 for detecting the atmospheric temperature Tatm and the vehicle speed v to step S96 for calculating the fuel cell temperature Tfc as that covering from step S11 to step S16 shown in FIG. 8 described in conjunction with the first preferred embodiment.

In consecutive step S97, the utilization rate Ufc of fuel gas is calculated and such a step is identical to step S57 of FIG. 14 described in conjunction with the third preferred embodiment.

In subsequent step S 98, the collected water amount predicting section 5 judges whether the water balance and the heat balance are satisfied in the same manner as step S17 shown in FIG. 8 related to the first preferred embodiment. However, in the presently filed preferred embodiment, the map shown in FIG. 16 is used for the water balance line, and the map of FIG. 4 used in the first preferred embodiment is utilized as the heat balance line.

Here, when it is judged that both the water balance and the heat balances remain in respective balanced target ranges, the operation goes to step S100 wherein the pressure controlling section 7 and the utilization rate controlling section 8 of the collected water amount controlling section 6 maintains the operating pressure Pfc and the gas utilization rate Ufc of the fuel cell body 20 to remain unchanged, and the operation returns to step S102.

On the other hand, when it is judged that the heat balance remains in its target range and the water does not remain in the target range, i.e., that the water balance remains negative, the operation goes to step S99 where the pressure controlling section 7 and the utilization rate controlling section 8 of the collected water amount controlling section 6 operates to increase the operating pressure Pfc and the gas utilization rate Ufc of the fuel cell body 20 by respective given values to improve the water balance, and the operation goes to step S102.

On the contrary, also, when it is judged that the water balance remains in its target range whereas the heat balance does not remain in the target range, the operation goes to step S101 where the pressure controlling section 7 and the utilization rate controlling section 8 of the collected water amount controlling section 6 operates to decrease the operating pressure Pfc and the gas utilization rate Ufc of the fuel cell body 20 by respective given values to improve the heat balance, and the operation goes to step S102.

Subsequently, in step S102, the collected water amount controlling section 6 judges whether the system efficiency is maximized on the basis of the map shown in FIG. 16. Also, the presence of the system efficiency being maximized refers to the fact that the system efficiency remains in a particular range wherein, in actual practice, the fuel cell system is operating at a preferable system efficiency, with such a particular range being preliminarily preset in the map of FIG. 6.

In step S102, when it is judged that the system efficiency is maximized, the operation goes to step S104 to cause the operating pressure Pfc and the gas utilization rate Ufc to remain unchanged, and the operation returns to S91.

In contrast, in step S012, when it is judged that the system efficiency is not maximized, the operation goes to step S103 to alter the combination of the operating pressure Pfc and the gas utilization rate Ufc while suitably referring to FIG. 16, and the operation returns to step S91.

Sixth Preferred Embodiment

Now, a fuel cell system of a sixth preferred embodiment and a related method according to the present invention are described below in detail mainly with reference to FIG. 19. The fuel cell system of the sixth preferred embodiment is fundamentally identical in structure to that of the first preferred embodiment but differs in that while in the first preferred embodiment the humidifying function and the water collecting function of the fuel cell body 20 are incorporated within the fuel cell body 20, the presently filed preferred embodiment features the provision of the fuel cell body 20 a humidifying unit and a water collecting unit are separately mounted outside the fuel cell body 20. The same component parts as those of the first preferred embodiment bear the same reference numerals as used therein and a detailed description of the same is herein omitted.

Figure 19:
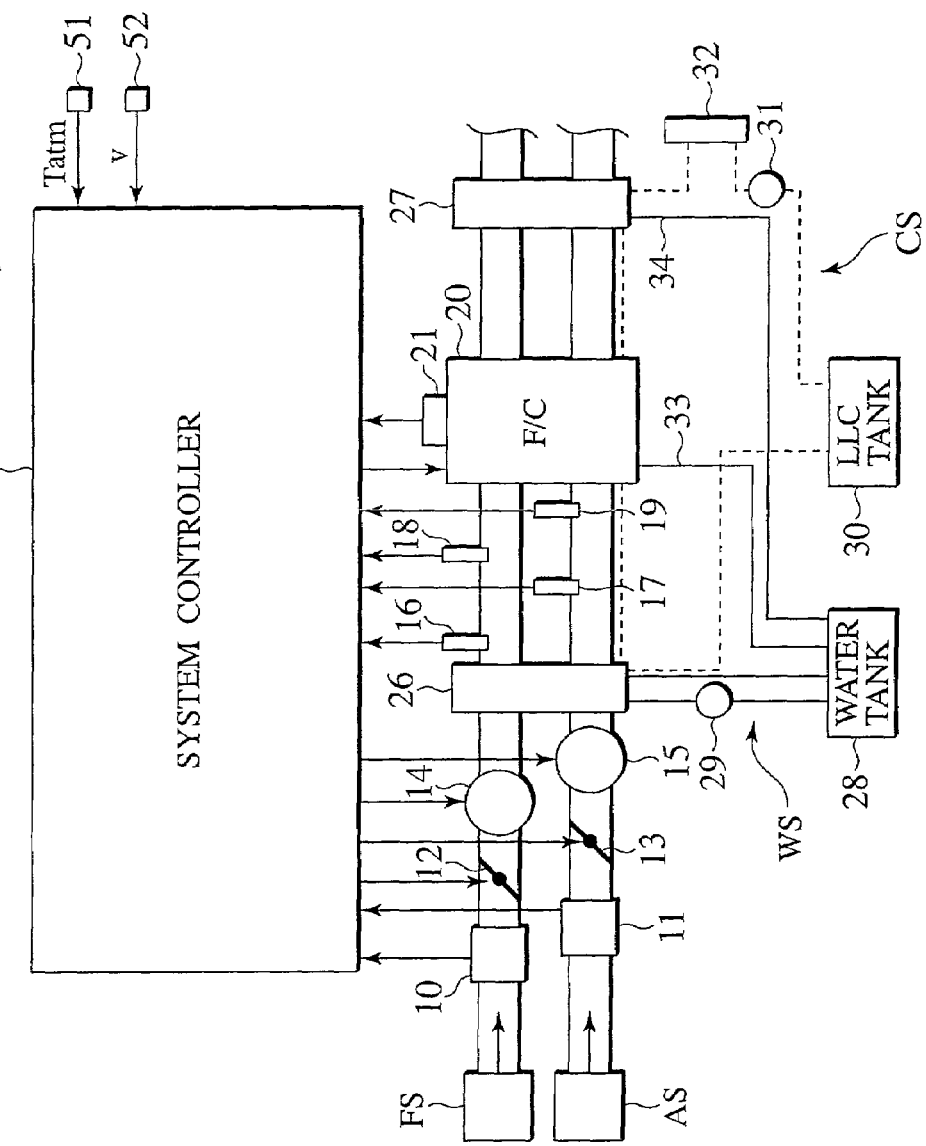
FIG. 19 is an overall structural view of a fuel cell system of a sixth preferred embodiment according to the present invention.

FIG. 19 shows an overall system of the fuel cell system of the sixth preferred embodiment.

As shown in FIG. 19, the fuel cell system of the sixth preferred embodiment differs in structure from of the first preferred embodiment in that a humidifying unit 26 is located upstream of the fuel cell body 20 and a water collecting unit 27 is located downstream of the fuel cell body 20. That is, it may be thought that the combination of the humidifying unit 26, the fuel cell body 20 and the water collecting unit 27 corresponds to the fuel cell body 20 of the previously discussed preferred embodiments.

Further, the fuel cell body 20 includes a cooling system CS and a water circulation system Ws which are separate from one another, with the cooling system CS serving to perform a temperature control function for the fuel cell body 20 whereas the water circulation system WS serves to perform a pure water supply function to supply pure water to the humidifying unit 26 and a water collecting function to collect water from the fuel cell body 20 and the water collecting unit 27. Thus, with such a structure, the water balance of the fuel cell system is controlled with the water circulation system WS, and the heat balance is controlled with the cooling system CS. Furthermore, the presence of the water circulation system WS and the cooling system CS which are formed separate from one another allows cooling medium not to be composed of pure water, and the cooling medium may include antirust additives or long life coolant (hereinafter referred to as LLC) admixed with antifreeze, with an example of a case with such application being described below.

More particularly, the water circulation system WS includes a water tank 28 and a pump 29 which delivers pure water from the water tank 28 to the humidifying unit 26 via a water supply conduit 33 under pressure, with discharge conduits 34, 35 allowing pure water, which are collected from the 2 fuel cell body 20 and the water collecting unit 27, to be returned to the water tank 28.

Further, the cooling system CS includes an LLC tank 30, a pump 31 and a radiator 32, with the LLC drawn with the pump 31 from the LLC tank 30 being cooled at the radiator 32 to be heat exchanged with exhaust gases at the water collecting unit 27 to condense steam contained in the exhaust gases and passing through a cooling water passage (not shown) formed in the fuel cell body 20 to be heat exchanged with fuel cell body 20 whereupon the LLC heats humidifying pure water of the water circulation system WS at the humidifying unit 26 and is returned to the LLC tank 30 in a cyclic manner.

In the sixth preferred embodiment, the control method for establishing the water balance and the heat balance to be performed in such a structure is principally carried out in the same manner as those of the first to fifth preferred embodiments previously set forth. However, it is to be noted that the humidifying unit 26, the fuel cell body 20 and the water collecting unit 27 of the presently filed preferred embodiment correspond to the fuel cell body 20 of the first to fifth preferred embodiment, and it is of course required to think that the generated heat amount includes generated heat amount components covering the humidifying unit 26, the fuel cell body 20 and the water collecting unit 27 to similarly correspond to the entire generated heat amount of the fuel cell system, and the fuel cell temperature is represented with the outlet temperature of the water collecting unit 27.

From the foregoing description, typically according to the present invention, since the fuel cell system includes a fuel cell body, a hydrogen supply system supplying hydrogen containing gas to the fuel cell body, an oxygen supply system supplying oxygen containing gas to the fuel cell body, a cooling system adjusting the temperature of the fuel cell body, a water circulation system supplying water to humidify the fuel cell body and collecting water discharged from the fuel cell body, a generated heat amount calculating section calculating a generated heat amount of the fuel cell body, a cooling performance calculating section calculating a cooling performance of the cooling system, a temperature calculating section calculating a fuel cell temperature of the fuel cell body on the basis of the generated heat amount calculated with the generated heat amount calculating section and the cooling performance calculated with the cooling performance calculating section, a collected water amount calculating section calculating an amount of water collected from the water circulation system on the basis of the fuel cell temperature calculated with the temperature calculating section, and a collected water amount controlling section controlling the amount of collected water discharged from the fuel cell body on the basis of the amount of collected water calculated with the collected water amount calculating section, it is possible for the amount of collected water to be controlled under a condition to establish the heat balance in the fuel cell system, enabling the operating condition to be realized for simultaneously establishing the heat balance and the water balance in the fuel cell system.

Further, since the amount of collected water is calculated on the basis of the detected values involving the amount, temperature and moisture of hydrogen containing gas to be supplied to the fuel cell body, the amount, temperature and moisture of oxygen containing gas to be supplied to the fuel cell body, and the temperature, amount and moisture of gas discharged from the fuel cell body, the amount of collected water can be accurately predicted to minimize an error in the amount of collected water to a value as low as possible.

Furthermore, calculating the fuel cell temperature on the basis of the amount of collected water calculated with the collected water amount calculating section in the previous operating routine enables a further accurate fuel cell temperature to be obtained.

Moreover, since the amount of collected water is controlled in a sense to satisfy the water balance and the heat balance correlated with the fuel cell body, it is possible for the water balance and the heat balance to be satisfied in the fuel cell system even when environmental conditions are varied.

Also, since the amount of collected water is controlled in response to the amount of water detected with the water amount detector, the water balance can be established even when the amount of water in the system does not reach the target value.

And, since the amount of collected water is controlled in response to the operating pressures related with the hydrogen containing gas and the oxygen containing gas to be supplied to the fuel cell body, the gas utilization rate related with the hydrogen containing gas and the oxygen containing gas to be supplied to the fuel cell body or the output of the fuel cell body, an accurate control of such parameter can be achieved.

In addition, since the amount of collected water is controlled in dependence the operating pressure related to the hydrogen containing gas to be supplied to the fuel cell body and the oxygen containing gas to be supplied to the fuel cell body and the coefficient of gas utilization related with the hydrogen containing gas to be supplied to the fuel cell body and the oxygen containing gas to be supplied to the fuel cell body, it is possible to improve the fuel consumption while establishing the water balance so as to maximize the operating efficiency of the fuel cell system.

The entire content of a Patent Application No. TOKUGAN 2001-194934 with a filing date of Jun. 27, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
 a fuel cell body;
 a hydrogen supply system supplying hydrogen containing gas to the fuel cell body;
 an oxygen supply system supplying oxygen containing gas to the fuel cell body;
 a cooling system adjusting the temperature of the fuel cell body;
 a water circulation system supplying water to humidify the fuel cell body and collecting water discharged from the fuel cell body;
 a generated heat amount calculating section configured to calculate a generated heat amount of the fuel cell body;
 a cooling performance calculating section configured to calculate a cooling performance of the cooling system;
 a temperature calculating section configured to calculate a fuel cell temperature of the fuel cell body on the basis of the generated heat amount calculated with the generated heat amount calculating section and the cooling performance calculated with the cooling performance calculating section;
 a collected water amount calculating section configured to calculate an amount of water collected from the water circulation system, while calculating, on the basis of water balance and heat balance related to the fuel cell temperature calculated with the temperature calculating section, a parameter satisfying the water balance and the heat balance; and
 a collected water amount controlling section configured to control the amount of collected water discharged from the fuel cell body on the basis of the amount of collected water calculated with the collected water amount calculating section.

2. The fuel cell system according to claim 1, wherein the fuel cell body has a humidifying function and a water collecting function,
 and wherein the cooling system and the water circulation system are provided to be doubled with one another.

3. The fuel cell system according to claim 1, further comprising:
 a humidifying unit humidifying the hydrogen containing gas and the oxygen containing gas to be supplied to the fuel cell body; and a water collecting unit collecting water from gas discharged from the fuel cell body,
wherein the water circulation system and the cooling system are separate from one another, with the water circulation system serving to supply water to the humidifying unit and to collect water from the water collecting unit while the cooling system serves to cool the fuel cell body.

4. The fuel cell system according to claim 1, wherein the collected water amount calculating section calculates the amount of collected water on the basis of the amount, temperature and moisture of hydrogen containing gas to be supplied to the fuel cell body, and the amount, temperature and moisture of oxygen containing gas to be supplied to the fuel cell body.

5. The fuel cell system according to claim 4, wherein the collected water amount calculating section further calculates the amount of collected water on the basis of the temperature of gas discharged from the fuel cell body.

6. The fuel cell system according to claim 5, wherein the collected water amount calculating section further calculates the amount of collected water on the basis of the amount and moisture of the gas discharged from the fuel cell body.

7. The fuel cell system according to claim 1, wherein the temperature calculating section further calculates the fuel cell temperature on the basis of the amount of collected water calculated with the collected water amount calculating section in a preceding routine.

8. The fuel cell system according to claim 1, wherein the collected water amount controlling section controls the amount of collected water so as to establish a water balance related to the fuel cell body.

9. The fuel cell system according to claim 8, wherein the collected water amount controlling section controls the amount of collected water so as to establish a heat balance related to the fuel cell body.

10. The fuel cell system according to claim 1, further comprising a water level detector detecting the amount of water within the fuel cell system,
wherein the collected water amount controlling section controls the amount of collected water in response to the amount of water detected with the water level detector.

11. The fuel cell system according to claim 1, wherein the collected water amount controlling section controls the amount of collected water in response to an operating pressure related to the hydrogen containing gas to be supplied to the fuel cell body and the oxygen containing gas to be supplied to the oxygen containing gas.

12. The fuel cell system according to claim 1, wherein the collected water amount controlling section controls the amount of collected water in response to a gas utilization rate related to the hydrogen containing gas to be supplied to the fuel cell body and the oxygen containing gas to be supplied to the oxygen containing gas.

13. The fuel cell system according to claim 1, wherein the collected water amount controlling section controls the amount of collected water in response to an output of the fuel cell body.

14. The fuel cell system according to claim 1, wherein the collected water amount controlling section controls the amount of collected water in response to an operating pressure related to the hydrogen containing gas to be supplied to the fuel cell body and the oxygen containing gas to be supplied to the oxygen containing gas, and a gas utilization rate related to the hydrogen containing gas to be supplied to the fuel cell body and the oxygen containing gas to be supplied to the oxygen containing gas.

15. A fuel cell system comprising:
a fuel cell body;
hydrogen supply means for supplying hydrogen containing gas to the fuel cell body;
oxygen supply means for supplying oxygen containing gas to the fuel cell body;
adjusting means for adjusting the temperature of the fuel cell body;
water circulation means for supplying water to humidify the fuel cell body and for collecting water discharged from the fuel cell body;
generated heat amount calculating means for calculating a generated heat amount of the fuel cell body;
cooling performance calculating means for calculating a cooling performance of the adjusting means;
temperature calculating means for calculating a fuel cell temperature of the fuel cell body on the basis of the generated heat amount calculated with the generated heat amount calculating means and the cooling performance calculated with the cooling performance calculating means;
collected water amount calculating means for calculating an amount of water collected through the water circulation means, while calculating, on the basis of water balance and heat balance related to the fuel cell temperature calculated with the temperature calculating means, a parameter satisfying the water balance and the heat balance; and
collected water amount controlling means for controlling the amount of collected water discharged from the fuel cell body on the basis of the amount of collected water calculated with the collected water amount calculating means.

* * * * *